US012487807B2

(12) United States Patent
Zhu et al.

(10) Patent No.: US 12,487,807 B2
(45) Date of Patent: Dec. 2, 2025

(54) SYSTEMS AND METHODS FOR GENERATING ENQUIRIES AND RESPONSES BASED ON APPLICATION METADATA

(71) Applicant: GOOGLE LLC, Mountain View, CA (US)

(72) Inventors: Chunlei Zhu, Mountain View, CA (US); Tianpeng Jin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 178 days.

(21) Appl. No.: 18/267,819

(22) PCT Filed: Jun. 7, 2021

(86) PCT No.: PCT/CN2021/098698
§ 371 (c)(1),
(2) Date: Jun. 16, 2023

(87) PCT Pub. No.: WO2022/256986
PCT Pub. Date: Dec. 15, 2022

(65) Prior Publication Data
US 2024/0053972 A1  Feb. 15, 2024

(51) Int. Cl.
*G06F 8/61* (2018.01)
*G06F 9/451* (2018.01)

(52) U.S. Cl.
CPC .............. *G06F 8/61* (2013.01); *G06F 9/451* (2018.02)

(58) Field of Classification Search
None
See application file for complete search history.

(56) References Cited

U.S. PATENT DOCUMENTS 9,720,887 B2 * 8/2017 Pappu .................. G06F 40/134
2005/0015713 A1   1/2005 Plastina et al.
(Continued)

FOREIGN PATENT DOCUMENTS

CN           101981563 A        2/2011

OTHER PUBLICATIONS

Beilke, "Building Integrated Websites with IBM Digital Experience" 2016, IBM (Year: 2016).*
(Continued)

*Primary Examiner* — Hossain M Morshed
(74) *Attorney, Agent, or Firm* — MARSHALL, GERSTEIN & BORUN LLP

(57) ABSTRACT

Systems and methods for generating enquiries and responses based on application metadata are provided. The systems and methods can include a data processing system ("DPS"). The DPS can receive, from a client device, a request for content. The DPS can access metadata of one or more applications available for installation, the metadata of each application comprises a plurality of field-value pairs including values received from a device corresponding to a publisher of the application. The DPS can determine, from the metadata, entries associated with the applications, comprising enquiries and corresponding responses. The DPS can select a content item including a subset of the one or more entries and an actionable object, which when selected, causes the client device to access an information resource from which an application of the one or more applications can be installed. The DPS can transmit the content item for display on the client device.

20 Claims, 6 Drawing Sheets

(56) References Cited

U.S. PATENT DOCUMENTS

| | | | | |
|---|---|---|---|---|
| 2010/0186009 A1* | 7/2010 | Sen | ............................ | G06F 8/61 |
| | | | | 717/174 |
| 2012/0089668 A1* | 4/2012 | Berg | ........................ | H04L 67/10 |
| | | | | 709/203 |
| 2013/0036117 A1 | 2/2013 | Fisher et al. | | |
| 2018/0239773 A1* | 8/2018 | Shaw | .................... | G06F 16/738 |
| 2021/0133235 A1* | 5/2021 | Klamra | .................. | G06F 16/639 |

OTHER PUBLICATIONS

International Search Report and Written Opinion for Application No. PCT/CN2021/098698, dated Mar. 2, 2022.

\* cited by examiner

| Field | Value |
|---|---|
| Name | "Duty of Call" |
| Categories | Action, Adventure, ... |
| Keywords | "Duty Call", "Duty of Call", ... |
| Image | Image Data |
| Description | "Duty of Call is a Simulation of ..." |
| URL | ExampleDoC.com |
| Rules or Policies | Rules to Interact with Application |
| Application Size | 150MB |
| Number of Downloads | 1.5M |
| Latest Version Update | 2.0.1 |

FIG. 3

SYSTEMS AND METHODS FOR GENERATING ENQUIRIES AND RESPONSES BASED ON APPLICATION METADATA

BACKGROUND

In a computerized content delivery network, electronic content items can be distributed from a content server to a user device via a content slot provided by a content publisher. A content provider can supply the content server with one or more content items. The content publisher can provide one or more content slots (e.g., content item slots) configured to render at least one content item. The content server can select at least one content item and provide the content item to the content slot. The content publisher can render the content item in the content slot for display on the client device.

SUMMARY

Content servers can select and provide content items of differing styles or formats to client devices. Content items can include images, videos, or other playable formats. In some implementations, content items can include one or more enquiries (sometimes referred to as inquiries) and one or more corresponding responses (e.g., predetermined choices, options, or interactive elements). Users of client devices can provide an input indicating a selection of at least one of the one or more responses. A content server can provide at least one content item to the client device. The user of the client device can select a response corresponding to at least one enquiry within the content item. Content providers that provide content items can provide rewards to users in response to the users successfully interacting with one or more content items. In some cases, content publishers rendering one or more content items via at least one corresponding content slot can provide the rewards after the users successfully interacting with the one or more content items. Incentivizing users with rewards can increase user engagement with the content items (e.g., increase participation, views, or user interaction with content items).

Conventionally, content providers can create or generate one or more enquiries for the content server to generate content items. With each enquiry, the content providers can provide a set of responses (e.g., selection of responses) corresponding to the enquiry. The content server can include the enquiry and the responses into a content item for rendering in at least one content slot provided by a content publisher of various content publishers. However, generating and storing enquiries and responses can be resource-intensive for the content server and time-consuming for content providers providing the enquiries, responses, or other content to generate content items. For instance, conventionally content providers may curate enquiries and responses, combinations or arrangements of the responses for each enquiry, or update the enquiries and responses for generating content items, which can be a time-consuming process. Further, since these enquiries and corresponding responses may be included in content items stored by the content servers, they can consume large amounts of storage resources from the content servers.

To address the challenges associated with interactive-type content items, namely, the amount of time consumed by content providers to generate enquiries and responses for such content items and the amount of storage resources consumed by content servers to store such content items, the systems and methods described herein can automatically generate enquiries and responses for content items. In some implementations, interactive-based content items can be used to promote or increase user engagement with certain applications (e.g., having enquiries directed to or based on information of the applications) to be installed on client devices.

For such interactive-based content items relating to client applications, the present disclosure can be directed to one or more processors (e.g., of a data processing system or a content server) configured to automatically generate enquiries and responses based on metadata associated with an application. The metadata can be accessible to the data processing system. By generating enquiries and responses from the metadata accessible to the data processing system, the data processing system can reduce the amount of data stored in a database as well as the amount of data transmitted to and received from the content provider. Further, the data processing system can reduce the amount of time an administrator of the content provider would spend to generate such enquiries and responses, arrange the content for content items, or update their inventory of enquiries and responses.

The data processing system can use interactive-based content items that are generated using the metadata of an application corresponding to the content item to educate users about the application and determine the accuracy of the metadata of the application. For example, depending on the responses from the users (e.g., selection of at least one response in a list of responses) provided to certain enquiries, the responses (or feedback) from the user can be used to confirm the accuracy of the metadata of the application. Thus, the systems and methods described herein can reduce resource consumption (e.g., from storing enquiries and interactive elements from the content providers via utilization of metadata corresponding to applications to generate content items), reduce network traffic (or network congestion), and reduce time consumption for content providers, as content providers would not need to transmit enquiries, responses, or content to the content server for generating content items.

At least one aspect is directed to a method of generating enquiries and responses based on application metadata. The method can include a data processing system comprising one or more processors and memory. The method can include receiving, by a data processing system, from a client device, a request for content. The method can include accessing, by the data processing system, metadata of one or more applications available for installation, the metadata of each application of the one or more applications comprises a plurality of field-value pairs including values received from a device corresponding to a publisher of the application. The method can include determining, by the data processing system, from the metadata, one or more entries associated with the one or more applications, the one or more entries comprising one or more enquiries and corresponding one or more responses. The method can include selecting, by the data processing system, a content item including a subset of the one or more entries and an actionable object, which when selected, causes the client device to access an information resource from which an application of the one or more applications can be installed. The method can include transmitting, by the data processing system, to the client device, the content item for display on the client device.

In some implementations, the method can include receiving, by the data processing system, from the client device, an input corresponding to a correct response associated with the content item. The method can include terminating, by the data processing system, the content item on the client device. The method can include disabling, by the data processing system, visibility of the content item from display on the client device. In some implementations, the application can be a first application and the request for content can comprise an identification of a second application including a content slot within which to present the content item. In some implementations, to select the content item, the method can include selecting, by the data processing system, the content item based on the identification of the second application and a type of the content slot.

In some implementations, the method can include selecting, by the data processing system, the subset of the one or more entries for inclusion in the content item, the data processing system selecting each entry of the subset by identifying, from the plurality of field-value pairs of the metadata of the application, a priority of each field, the priority assigned based on i) a number of values associated with the field, or ii) a number of incorrect responses previously received from client devices to which content items including enquiries for the field. In some implementations, the subset of the one or more entries can be selected for inclusion in the content item using a selection model. The method can include receiving, by the data processing system, from the client device, interaction data with the content item presented on the client device, the interaction data identifying responses selected at the client device. The method can include updating, by the data processing system, the selection model for selecting a plurality of entries for a plurality of client devices based on the interaction data from the client device.

In some implementations, the content item can include a script, which when executed on the client device, can cause the client device to present the subset of the one or more entries within a content slot. The script can cause the client device to detect interaction data from selection of one or more interactive elements associated with the subset of the one or more entries. The script can cause the client device to provide, to the data processing system, the interaction data detected from the selection of the one or more interactive elements within the content slot.

In some implementations, the content item can comprise an image corresponding to a reward and a script, which when executed on the client device, can cause the client device to present the subset of the one or more entries within a content slot. The script can cause the client device to detect first interaction data from selection of one or more interactive elements associated with the subset of the one or more entries. The script can cause the client device to determine that the selection indicate an incorrect response. The script can cause the client device to provide, to a display device of the client device, a notification indicating that the selection is incorrect. The script can cause the client device to detect second interaction data from selection of other one or more interactive elements associated with the subset of the one or more entries. The script can cause the client device to determine that the selection indicate a correct response. The script can cause the client device to present, to the display device of the client device, the image corresponding to the reward responsive to determining that the second interaction data corresponds to the correct response.

In some implementations, the method can include determining, by the data processing system, subsequent to presenting the content item on the client device, that an interaction time exceeds a threshold. The method can include triggering, by the data processing system, a script of the content item to cause the client device to present a reward corresponding to the content item responsive the interaction time exceeding the threshold. In some implementations, the content item can comprise a script, which when executed on the client device, can cause the client device to present the subset of the one or more entries within a content slot. The script can cause the client device to detect interaction data from selection of one or more interactive elements associated with the subset of the one or more entries. The script can cause the client device to determine that the selection indicates a correct response. The script can cause the client device to transmit, responsive to determining that the correct response was selected, to an entity associated with a content provider, an instruction to update a value corresponding to the content provider, the value corresponding to a performance metric of the content item including the subset of the one or more entries and the actionable object associated with the application.

At least one aspect is directed to a system for generating enquiries and responses based on application metadata. The system can include a data processing system comprising one or more processors and memory. The data processing system can receive, from a client device, a request for content. The data processing system can access metadata of one or more applications available for installation, the metadata of each application of the one or more applications comprises a plurality of field-value pairs including values received from a device corresponding to a publisher of the application. The data processing system can determine, from the metadata, one or more entries associated with the one or more applications, the one or more entries comprising one or more enquiries and corresponding one or more responses. The data processing system can select a content item including a subset of the one or more entries and an actionable object, which when selected, causes the client device to access an information resource from which an application of the one or more applications can be installed. The data processing system can transmit, to the client device, the content item for display on the client device.

In some implementations, the data processing system can receive, from the client device, an input corresponding to a correct response associated with the content item. The data processing system can terminate the content item on the client device. The data processing system can disable visibility of the content item from display on the client device. In some implementations, the application can be a first application and the request for content can comprise an identification of a second application including a content slot within which to present the content item. In some implementations, to select the content item, the data processing system can select the content item based on the identification of the second application and a type of the content slot.

In some implementations, the data processing system can select the subset of the one or more entries for inclusion in the content item, the data processing system selecting each entry of the subset by identifying, from the plurality of field-value pairs of the metadata of the application, a priority of each field, the priority assigned based on i) a number of values associated with the field, or ii) a number of incorrect responses previously received from client devices to which content items including enquiries for the field. In some implementations, the subset of the one or more entries can be selected for inclusion in the content item using a selection model. The data processing system can receive, from the client device, interaction data with the content item presented on the client device, the interaction data identifying responses selected at the client device. The data processing system can update the selection model for selecting a plurality of entries for a plurality of client devices based on the interaction data from the client device.

In some implementations, the content item can include a script, which when executed on the client device, can cause the client device to present the subset of the one or more entries within a content slot. The script can cause the client device to detect interaction data from selection of one or more interactive elements associated with the subset of the one or more entries. The script can cause the client device to provide, to the data processing system, the interaction data detected from the selection of the one or more interactive elements within the content slot.

In some implementations, the content item can comprise an image corresponding to a reward and a script, which when executed on the client device, can cause the client device to present the subset of the one or more entries within a content slot. The script can cause the client device to detect first interaction data from selection of one or more interactive elements associated with the subset of the one or more entries. The script can cause the client device to determine that the selection indicate an incorrect response. The script can cause the client device to provide, to a display device of the client device, a notification indicating that the selection is incorrect. The script can cause the client device to detect second interaction data from selection of other one or more interactive elements associated with the subset of the one or more entries. The script can cause the client device to determine that the selection indicate a correct response. The script can cause the client device to present, to the display device of the client device, the image corresponding to the reward responsive to determining that the second interaction data corresponds to the correct response.

In some implementations, the data processing system can determine, subsequent to presenting the content item on the client device, that an interaction time exceeds a threshold. The data processing system can trigger a script of the content item to cause the client device to present a reward corresponding to the content item responsive the interaction time exceeding the threshold. In some implementations, the content item can comprise a script, which when executed on the client device, causes the client device to present the subset of the one or more entries within a content slot. The script can cause the client device to detect interaction data from selection of one or more interactive elements associated with the subset of the one or more entries. The script can cause the client device to determine that the selection indicates a correct response. The script can cause the client device to transmit, responsive to determining that the correct response was selected, to an entity associated with a content provider, an instruction to update a value corresponding to the content provider, the value corresponding to a performance metric of the content item including the subset of the one or more entries and the actionable object associated with the application.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is an example table of a field-value pair of application metadata, according to an implementation;

DETAILED DESCRIPTION

Figure 1:
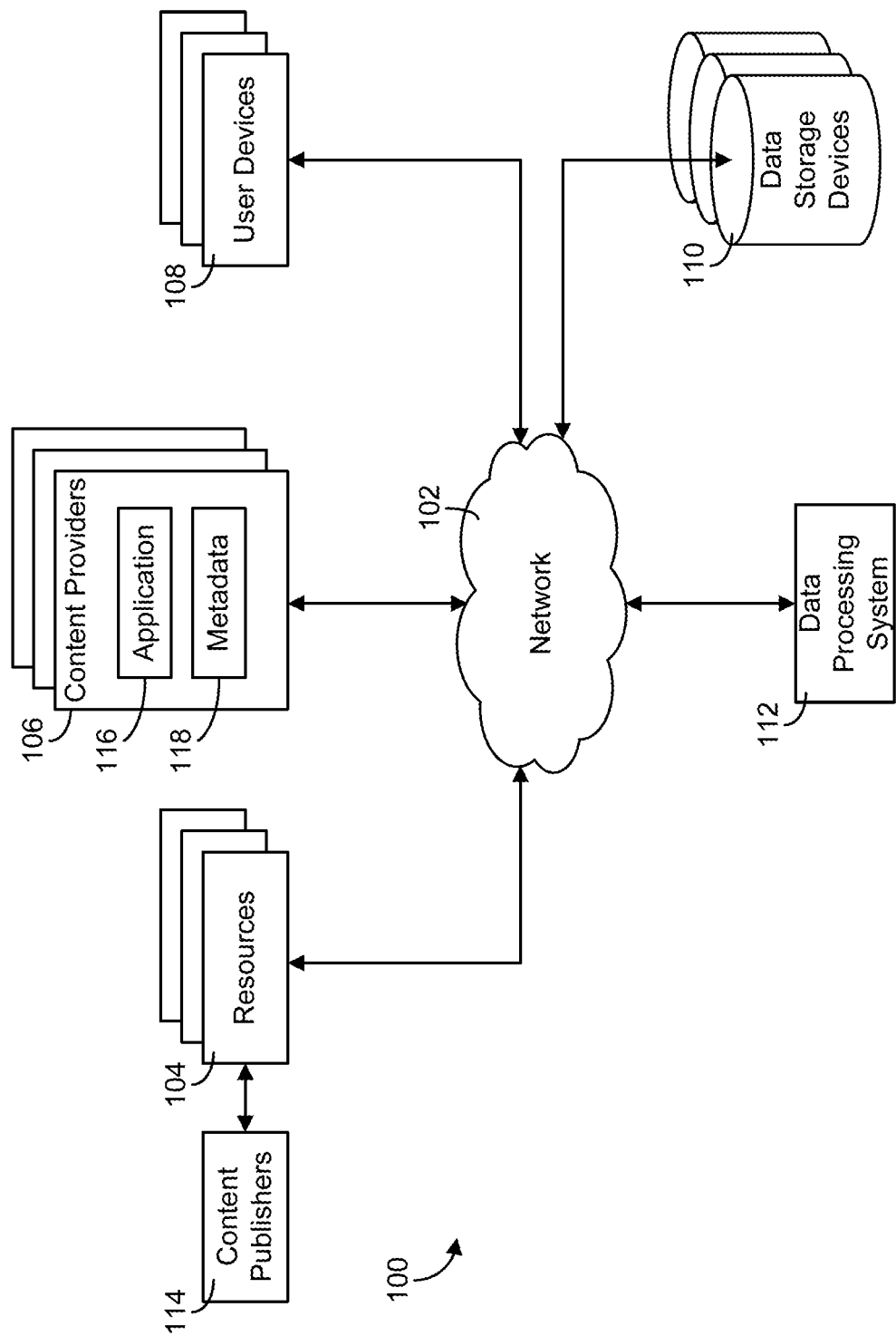
FIG. 1 is a block diagram of a computer system including a network, resources, content providers, user devices, data storage devices, a data processing system, and content publishers, according to an implementation.

Following below are more detailed descriptions of various concepts related to, and implementations of, methods, apparatuses, and systems of generating enquiries and responses based on application metadata for content items. The various concepts introduced above and discussed in greater detail below may be implemented in any of numerous ways, as the described concepts are not limited to any particular manner of implementation.

Content servers can select and provide content items of differing styles or formats to client devices. Content items can include images, videos, other playable formats, or other elements configured to be rendered for display on a client device. The content items can be interactive (e.g., includes at least one interactive element in the content item) or playable when rendered on the client device. In some implementations, content items can include one or more enquiries (sometimes referred to as inquiries) and one or more corresponding responses (e.g., predetermined choices, options, or interactive elements for users to select). Users of client devices can provide an input indicating a selection of at least one of the one or more responses. A content server can provide at least one content item to the client device. The user of the client device can select a response corresponding to at least one enquiry within the content item. Content providers that provide content items can provide rewards to users in response to the users successfully interacting with one or more content items. In some cases, content publishers rendering one or more content items via at least one corresponding content slot can provide the rewards after the users successfully interacting with the one or more content items. Incentivizing users with rewards can increase user engagement with the content items (e.g., increase participation, views, or user interaction with content items).

Conventionally, content providers can create or generate one or more enquiries for the content server to generate content items. With each enquiry, the content providers can provide a set of responses (e.g., selection of responses) corresponding to the enquiry. The content server can include the enquiry and the responses into a content item for rendering in at least one content slot provided by a content publisher of various content publishers. However, generating and storing enquiries and responses can be resource-intensive for the content server and time-consuming for content providers providing the enquiries, responses, or other content to generate content items. For instance, conventionally content providers may curate enquiries and responses, combinations or arrangements of the responses for each enquiry, or update the enquiries and responses for generating content items, which can be a time-consuming process. Further, since these enquiries and corresponding responses may be included in content items stored by the content servers, they can consume large amounts of storage resources from the content servers.

To address the challenges associated with interactive-type content items, namely, the amount of time consumed by content providers to generate enquiries and responses for such content items and the amount of storage resources consumed by content servers to store such content items, the systems and methods described herein can automatically generate enquiries and responses for content items. In some implementations, interactive-based content items can be used to promote or increase user engagement with certain applications (e.g., having enquiries directed to or based on information of the applications) to be installed on client devices.

For such interactive-based content items relating to client applications, the present disclosure can be directed to one or more processors (e.g., of a data processing system or a content server) configured to automatically generate enquiries and responses based on metadata associated with an application. The metadata can be accessible to the data processing system. By generating enquiries and responses from the metadata accessible to the data processing system, the data processing system can reduce the amount of data stored in a database as well as the amount of data transmitted to and received from the content provider. Further, the data processing system can reduce the amount of time an administrator of the content provider would spend to generate such enquiries and responses, arrange the content for content items, or update their inventory of enquiries and responses.

The data processing system can use interactive-based content items that are generated using the metadata of an application corresponding to the content item to educate users about the application and determine the accuracy of the metadata of the application. For example, depending on the responses from the users (e.g., selection of at least one response in a list of responses) provided to certain enquiries, the responses (or feedback) from the user can be used to confirm the accuracy of the metadata of the application. Thus, the systems and methods described herein can reduce resource consumption (e.g., from storing enquiries and interactive elements from the content providers via utilization of metadata corresponding to applications to generate content items), reduce network traffic (or network congestion), and reduce time consumption for content providers, as content providers would not need to transmit enquiries, responses, or content to the content server for generating content items.

Referring now to FIG. 1, a block diagram of a computer system 100 is shown, according to an implementation. The computer system 100 can include at least a network 102, resources 104, content providers 106, user devices 108 (sometimes referred to as client devices), data storage devices 110, a data processing system 112 ("DPS"), and content publishers 114. The DPS 112 can be referred to as or include features and functionalities of a content server to generate content items. The network 102 can facilitate communication or connection between resources 104, content providers 106, user devices 108, data storage devices 110, DPS 112, and content publishers 114. For example, user devices 108 may request and receive resource content (e.g., web pages, documents, an application, etc.) from resources 104 via network 102. In some implementations, resources 104 may include content item slots for presenting third-party content items from content providers 106. Information and data from the resources 104, such as content slots, web pages, documents, application resources, application metadata, among others, can be provided by the content publishers 114 managing the resources 104. For example, content publishers 114 can transmit or provide data (e.g., metadata, information, scripts, codes, etc.) related to applications, web pages, documents, or other services to the resources 104. One or more components of the computer system 100 (e.g., content providers 106, user devices 108, data storage devices 110, or a DPS 112) can access the resources 104. The DPS 112 may receive a request for a content item from user devices 108, select an eligible content item or generate a content item in response to the request, and distribute the content item to user devices 108 via network 102. The request for a content item from the user devices 108 can be in response to the user devices 108 accessing an application, a web page, or other resources 104 managed by at least one content publisher 114. The resource 114 can include at least one content slot for rendering a content item. To distribute the content item, the DPS 112 can provide the selected or generated content item to the content slot provided by a content publisher 114. Accordingly, the content item can be rendered in the content slot of the respective resource 114 (e.g., applications, web pages, documents, etc.). In some implementations, one or more generated content items can be stored in the data storage devices 110, accessible by the DPS 112.

Network 102 can be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102. Network 102 can facilitate communication or connection between components of the computer system 100.

The computer system 100 can include resources 104. Resources 104 may include any type of information or data structure that can be provided over network 102. In some implementations, resources 104 may be identified by a resource address associated with each resource (e.g., a uniform resource locator (URL)). Resources 104 may include web pages (e.g., HTML web pages, PHP web pages, etc.), applications (e.g., downloadable or installable software, which can be executed locally or via connection to the network 102), word processing documents, portable document format (PDF) documents, images, video, programming elements, interactive content, streaming video/audio sources, or other types of electronic information. Resources 104 may include content or user interface (e.g., words, phrases, images, sounds, videos, computer graphics ("CGs"), etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by an application running on user devices 108).

In some implementations, resources 104 may include content slots for presenting third-party content items. For example, resources 104 may include one or more inline frame elements (e.g., HTML "iframe" elements, <iframe> . . . </iframe>) for presenting third-party content items from content providers 106. Resources 104 can include content slots for presenting content items generated by the DPS 112. An inline frame can be the "target" frame for links defined by other elements and can be selected by user agents (e.g., user devices 108, a web browser running on user devices 108, an application executing on user devices 108, etc.) as the focus for printing, viewing its source, or other forms of user interaction. The content slots may cause user devices 108 to request third-party content items from the DPS 112 in response to viewing first-party resource content from resources 104. For example, the user can initiate an application (e.g., local application, network application, etc.) on a user device 108. The user device 108 can request information associated with the application (e.g., images, user interface, video, interactive elements, content slots, etc.) from the resources 104. The content slots of the application can cause the user device 108 to request content items from the DPS 112, for example, by transmitting a request for content to the DPS 112. The DPS 112 can receive the request for content and generate at least one content item accordingly. The DPS 112 can provide or transmit one or more content items to the content slots for rendering the content item in the application executing on the user device 108.

The computer system 100 can include content publishers 114. Content publishers 114 can be referred to as application publisher, website publisher, or resource provider, for example. Content publishers 114 can provide data to the resources 104, such as application data, web pages, documents, etc. Content publishers 114 can generate the data to provide the resources 104. For example, content publishers 114 can create, modify, or delete web pages, applications, word processing documents, portable document format (PDF) documents, images, video, programming elements, interactive content, streaming video/audio sources, or other types of electronic information from the resources 104. Content publishers 114 can provide first-party resource content to the resources 104. User devices 108 can request the first-party resource content via respective applications executing on the user devices 108.

In some implementations, content publishers 114 can publish a webpage or provide access to applications including slots for inserting supplementary content provided by a content provider other than the content publisher 114. For example, in such techniques, the content publisher 114 may insert a script (e.g., in the form of JAVASCRIPT) into a header of an application. When the application is loaded, the script can trigger the user device 108 to contact one or more content providers 106 to provide supplementary information for selecting or generating content for inclusion in the application (e.g., relevancy scores for user device 108, interaction rates, the likelihood of interaction by the user, bid values, etc., or any combination thereof). In some cases, the script can trigger the user device 108 to contact DPS 112 to generate or select content items to include in the slots, for example, using supplemental information provided by content providers 106.

In some implementations, content publishers 114 can provide incentives for users to engage with content items rendered in one or more content slots of the respective applications of the content publishers 114. For example, a content publisher 114 can provide one or more inline frame elements or data indicating a type of content slot (e.g., banner, notification, or interstitial content slot) to include in an application, web page executing on a web browser, or a document presented in a document processing application. The content publisher 114 can provide codes, script, or computer-readable instruction indicating positions or locations of one or more content slots, an interval for displaying the content slots (e.g., 10-minutes cycle, 20-minutes cycle, etc.), conditions to disable visibility or terminate display of the content slots (e.g., interaction with an interactive element rendered in the content slot, a time-out period, etc.), or incentives (e.g., rewards) to be provided to the user device (e.g., a user account accessed in the executed application) when successfully interacting with an interactive element of the content item. Content publishers 114 can provide an incentive associated with the application executing on the user device 108, such as coins, points, cosmetics, objects, accessories, or other items from the application (e.g., usable, equitable, or collectible in the application). Content publishers 114 can indicate one or more conditions for the user to satisfy for transmitting the incentives. The conditions can include at least a successful response from the user device 108 or engagement with the content item for a predetermined time threshold (e.g., 30 seconds, 1 minute, etc.), for example.

In some implementations, content publishers 114 can enroll or opt into the features or functionalities (e.g., service) provided by DPS 112. For example, content publishers 114 can provide or allocate content slots for rendering content items. If content publishers 114 are opting into the service provided by DPS 112, the DPS 112 can provide generated content items for render in the content slots. The content publishers 114 can provide incentives or rewards for when users satisfy conditions of the content item (e.g., duration of engagement or successful interaction or selection of one of the responses). The user can select at least one response from the list of predetermined responses corresponding to the enquiry. The DPS 112 can monitor user interaction with the content item. If the user provides a satisfying or successful response to the enquiry, the DPS 112 can access the resources 104 to retrieve a reward to provide to the user device 108. DPS 112 can transmit, render, or present the reward to the user device 108, which is reflected in the application executing on the user device 108 (e.g., application of the content publisher 114).

Computer system 100 can include content providers 106. Content providers 106 may include one or more electronic devices representing administrators, resource operators, business owners, or other entities using the services provided by DPS 112. Content providers 106 can include at least an application 116 and at least metadata 118. Application 116 can include software, codes, scripts, hyperlinks, among other information to direct the user device 108 to an installation page of the application, install the application, execute the application, etc. Data of application 116 can be accessed by DPS 112, for example, to provide user device 108 with an executable file for installing application 116 of a content provider 106. In some cases, at least a subset or a portion of the information of application 116 can be provided to the resources 104, for user devices 108 to access and execute the application associated with the content providers 106. Metadata 118 can include various field-value pairs associated with the application 116. At least a portion or a subset of metadata 118 can be presented in the installation page (e.g., store page) of application 116, indicating description or backend information of the application 116. In some implementations, the metadata of the application can be provided by the content provider 106. In some implementations, the metadata of the application can be determined by the DPS or another system in communication with the DPS. For instance, a total number of application downloads, or statistics relating to devices that have downloaded the application may be determined by the DPS or the other system instead of being received by the content provider 106.

For example, fields of field-value pairs can include at least one of title, description, genre or categories, search terms or keywords, at least one image, address to application 116 page, rules or policies, application size, total number of downloads, the latest version of application 116, release date, at least one video (e.g., trailer or initial presentation of application 116 content), one or more content creators, reviews, ratings, or other topic related to or associated with application 116. Values of field-value pairs can include description, text, data, or file corresponding to the field, such as texts for the title, description text of application 116, image data, hyperlink or uniform resource locator ("URL"), or indication of application 116 genre (e.g., in text) for the categories field.

Content providers 106 can communicate data of application 116 or metadata 118 to DPS 112. In some cases, application 116 or metadata 118 can be accessed by DPS 112 to generate content items. For example, the field-value pair can be used by the DPS 112 to generate one or more enquiries and corresponding responses. The DPS 112 can use at least one enquiry and at least one response associated with the enquiry. The DPS 112 can identify or generate one or more responses (e.g., from other metadata of other applications) not included in the field-value pairs of the application 116. In further example, DPS 112 can select categories of application 116 as an enquiry (e.g., "what is the genre of this app"). If the categories for application 116 include action, adventure, and strategy, the DPS 112 can select action as one of the responses. For other responses, the DPS 112 can identify categories not listed in the metadata 118 of application 116, such as mystery, strategy, business, puzzle, or simulation. The DPS 112 can select at least one category that is not a part of the metadata 118 for other responses. Accordingly, the DPS 112 can generate at least one content item having an enquiry and various responses.

In some implementations, content providers 106 can be one or more administrators or developers of application 116. Content providers 106 may register with the DPS 112 to allow the application of the content provider 106 to be available through an application store or marketplace. The content provider 106 can provide the metadata of the application to the DPS as part of the registration process. In some implementations, the DPS can generate one or more field-value pairs of the metadata based on the content of the application or based on data received from the content provider 106. In some implementations, the DPS can generate one or more field-value pairs of the metadata of the application based on an analysis of devices that have installed or requested access to the application. Content providers 106 can be an editor of metadata 118 of application 116. For example, if content provider 106 is a developer promoting application 116, content provider 106 can provide metadata 118 to provide details of application 116 to users of user devices 108. In some cases, a content provider 106 can be a retailer promoting products (e.g., electronics, clothing, accessories, household items, etc.). Each of content providers 106 may communicate product information associated with a different set of products to DPS 112.

In some implementations, content providers 106 can enroll or opt into the features or functionalities (e.g., service) provided by DPS 112, such as automatically generating content items using application metadata. For example, content providers 106 can allow DPS 112 to access and use application metadata provided by the content providers 106. When opted-into the service, DPS 112 can access metadata 118 of application 116 to generate one or more enquiries and responses. Content providers 106 may not need to provide individual enquiries or responses corresponding to each enquiry for DPS 112 to generate content items. In some implementations, content providers 106 can transmit an instruction or rules for generating content item, such as background image for rendering the content item, arrangement of the selectable responses (e.g., based on alphabetical order or values of the responses). Values of the responses can refer to the hex value, binary value, or the size of the number for rendering in the response. Content providers 106 can indicate which field-value pair(s) for DPS 112 to generate one or more content items.

In some implementations, after generating a content item, DPS 112 can store the content item in at least one of various data storage devices 110. In some other implementations, the DPS 112 may not store generated content items in the data storage devices 110. For example, responsive to receiving a request for content, DPS 112 can fetch the most updated metadata 118 from the content providers 106 (e.g., in the application page, store page, or installation page associated with application 116). In another example, DPS 112 can store a portion of the generated content item for use in generating other content items, such as the background theme/image, types of field-value pairs to use, dimensions of the content item, or other configuration that can be used as a template for generating additional content items.

In some implementations, content providers 106 can submit or configure campaign parameters to DPS 112. The campaign parameters may be used to control the distribution of content items to user devices 108. The campaign parameters may include keywords associated with the content items, bids corresponding to the keywords, types of applications to display content items, types of applications not to display content items, a content distribution budget, geographic limiters, or other criteria used by DPS 112 to determine when a content item may be presented to user devices 108.

Content providers 106 may access DPS 112 to monitor the performance of the content items distributed according to the established campaign parameters. For example, content providers 106 may access DPS 112 to review one or more behavior metrics associated with a content item or set of content items. The behavior metrics may describe the interactions between user devices 108 with respect to a distributed content item or set of content items (e.g., number of impressions, number of clicks, number of conversions, an amount spent, etc.). In some cases, the behavior metrics can describe the interactive elements selected by the users and the description corresponding to those interactive elements, such as rendered texts, field-value pair, or metadata 118 of the application 116.

Computer system 100 can include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or DPS 112. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). The application can be installed on the user devices 108 or accessed via the communication interface, such as to access network application executing on the DPS 112 or devices of content publishers 114. The application can be installed by accessing or visiting a store page of the application, an application page of content publishers 114, or an application page (e.g., for application 116 linked in a content item) of content providers 106, for example. User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, user devices 108 may be capable of detecting an interaction with a distributed content item. An interaction with a content item may include hovering over the content item, clicking on the content item (e.g., interactive element in the content item), viewing source information for the content item, or any other type of interaction between user devices 108 and a content item. In some cases, interaction with a content item may not require explicit action by a user with respect to a particular content item. In some implementations, an impression (e.g., displaying or presenting the content item) may qualify as an interaction. In such implementations, the content item can be terminated or hidden from display after a predetermined time. The criteria for defining which user actions (e.g., active or passive) qualify as an interaction may be determined on an individual basis (e.g., for each content item), by content providers 106, or by DPS 112.

User devices 108 may be configured to execute computer-readable instructions (e.g., software code, Javascript®, ECMAScript®, etc.) in response to a detected interaction with a content item. The computer-readable instructions may be included in a distributed content item or otherwise provided to user devices 108. In some implementations, the computer-readable instructions cause user devices 108 to present a personalized visual display in response to a detected interaction with a content item. The personalized visual display can refer to a relevant visual display geared towards the respective user or towards the application, web page, or document accessed by the user. The personalized visual display may include multiple product images associated with a single content provider 106. If the visual display includes images, the images can be arranged in a collage, mosaic, or other visual presentation formats such that multiple images may be presented concurrently to user devices 108. The visual display can be associated with an application geared towards the user and can include image of the application or a link to direct the user device 108 to an application page (e.g., to install or review details of the application). The computer-readable instructions can cause user devices 108 to present details or elements of the application in the visual display (e.g., a summary of the application, specifications, price, images, purchasing information, release date, etc.) in response to a detected interaction with the associated application image or the application link in the personalized visual display.

Computer system 100 can include data storage devices 110. Data storage devices 110 may be any type of memory device capable of storing profile data, content item data, accounting data, or any other type of data used by DPS 112. In some cases, data storage devices 110 can store data for use by other components of the computer system 100, such as content providers 106 or user devices 108. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, data storage devices 110 may be local to DPS 112, or content providers 106. In other implementations, data storage devices 110 may be remote data storage devices connected with DPS 112 via network 102.

Data storage devices 110 can store various templates to generate content items for different types of content slots. For example, data storage devices 110 can store templates for video content slots, banner content slots, static content slots, interstitial content slots, notification content slots, among others. The templates can have varying dimensions, which one or more content items can be stretched or shrunk to fit the template. Based on the type of content slot (e.g., type of content item to be displayed in the slot), DPS 112 can use different templates to generate content items. Data storage devices 110 can store data of application 116 for content providers 106. Data storage devices 110 can store metadata 118. In some implementations, data storage devices 110 can store at least a subset of information from resources 104.

Data storage devices 110 can store historical data of the user (e.g., the user account or user devices 108). Data storage devices 110 can store historical user interaction with content items rendered in applications of at least one content publisher 114. For example, data storage devices 110 can include, store, or maintain information related to user responses to an enquiry, such as selections of interactive elements based on the application metadata or randomly generated interactive elements. The interaction data can be used by DPS 112 to determine performance data or a performance metric (e.g., measuring the performance) of the application metadata. For example, if most users select the same interactive element as the response to an enquiry, DPS 112 can determine whether the enquiry is not comprehensible (e.g., would not confuse the users selecting at least one response corresponding to the enquiry), whether the application metadata is inaccurate if most users click the first selectable element provided in the content item, or other indications or implications derivable from the performance data of content items. In some cases, DPS 112 can notify content providers 106 of the performance metric. For example, DPS 112 can indicate the general trend or common responses provided by the user to one or more enquiries. Based on the common responses, the content providers 106 can review, update, or maintain application metadata. Content providers 106 can provide instructions to the DPS 112 to generate similar content items with high-performance, not to generate content items with low-performance, or generate content items having a higher amount of interaction rate.

Data storage devices 110 can store user information associated with user devices 108. User information can include, for example, user-specific information (e.g., user demographics, user preferences, user behavior data, user profile data, etc.), contextual information (e.g., user location, web page context, recent page views, etc.), keyword information (e.g., keywords associated with a particular web page or search query, etc.), and/or other information which may be used to generate enquiries or responses which are relevant or interesting to a particular user or user device. User information can include applications installed on the user device 108, applications recently used by the user (e.g., within an hour, a day, a week, etc.), or categories (e.g., genres) of the applications executed or installed by the user.

For situations in which the systems discussed here collect personal information about users, or may make use of personal information, the users are provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data are treated (e.g., by DPS 112) in one or more ways before it is stored or used, so that personally identifiable information is removed. For example, a user's identity are treated so that no personally identifiable information can be determined for the user, or a user's geographic location may be generalized where location information is obtained (such as to a city, ZIP code, or state level), so that a particular location of a user cannot be determined. Thus, a user has control over how information is collected (e.g., by an application, by user devices 108, etc.) and used by DPS 112.

In some implementations, data storage devices 110 may be part of a data storage server or system capable of receiving and responding to requests from DPS 112. For example, data storage devices 110 may receive requests for application metadata or user information from DPS 112 and provide the requested information to DPS 112. Data storage devices 110 can store other data from any components of the computer system 100, which can be described herein, in addition to the data discussed above.

Computer system 100 can include a DPS 112 (sometimes referred to as a content server, computing system, or processing component of computer system 100). DPS 112 can receive or retrieve application metadata from content providers 106 and/or data storage devices 110. In some implementations, the application metadata can be updated in real-time or before retrieved by the DPS 112. For example, the content provider 106 can provide an update to metadata 118. Responsive to the update, application metadata associated with application 116 of the content provider 106, stored in data storage devices 110, can be updated. In some implementations, metadata 118 can be provided directly from content providers 106 for DPS 112 to generate enquiries and responses. In some implementations, metadata 118 can be determined by the DPS 112 based on data collected by the DPS 112 or another system in communication with the DPS 112. For example, a total number of downloads, or an application size of the application can be determined by the DPS 112 without receiving the data from the content provider. The DPS 112 can generate or select various enquiries or responses that are estimated to be most relevant or interesting to a particular user or user device (e.g., the user device on which the personalized visual display is to be presented). The generated enquiries can be based on, for example, types of enquiries users are likely to inquire when looking to install an application, such as the genre of the application, what the application is generally about, the rules or policies of the application, or generally what to expect when installing/using the application.

DPS 112 can generate the content item which can be personalized to the user (e.g., based on user information, search history, cookies, queries, or applications executed by or installed on the user device 108) and cause the content item to be presented via the particular user device via content slots provided by content publishers 114. The content item can include a background display (e.g., transparency, color, image, watermark, etc.) which are presented via presented in the corresponding content slot. The background display can be based on or from application metadata, such as an image of the application or color matching the background of the application page.

The content item can include interactive elements, such as a link to an application 116 (e.g., a second application different from a first application executing on the user device 108 having the content slot and rendering the content item) of the content provider 106 or choices for responding to the enquiry. DPS 112 can select the choices for the user based on at least one field-value pair of application metadata. DPS 112 can generate or select at least one choice using a value from the corresponding field-value pair and generate other choices based on values corresponding to the field, but not in the field-value pair. For example, if the enquiry indicates for the user to select a response with a rule of a second application, such as chess, DPS 112 can generate at least one choice having one of the rules from the second application (e.g., checkmating opponent wins the match) and generate other choices not related to the second application (e.g., move up a level by collecting coins, swipe left or right to turn, using 'w' 's' 'd' keys to move, etc.). DPS 112 can present a portfolio including performance metric or status of the campaign to the content providers 106. The portfolio presented to the content providers 106 can indicate conversion event (e.g., a click, a page view, etc.) from user devices 108, conversion rate (e.g., clickthrough rate, amount of times view, application 116 installation after user interaction with the interactive element, etc.), or campaign cost for utilizing the service of DPS 112. DPS 112 is described in greater detail with reference to FIG. 2.

Figure 2:
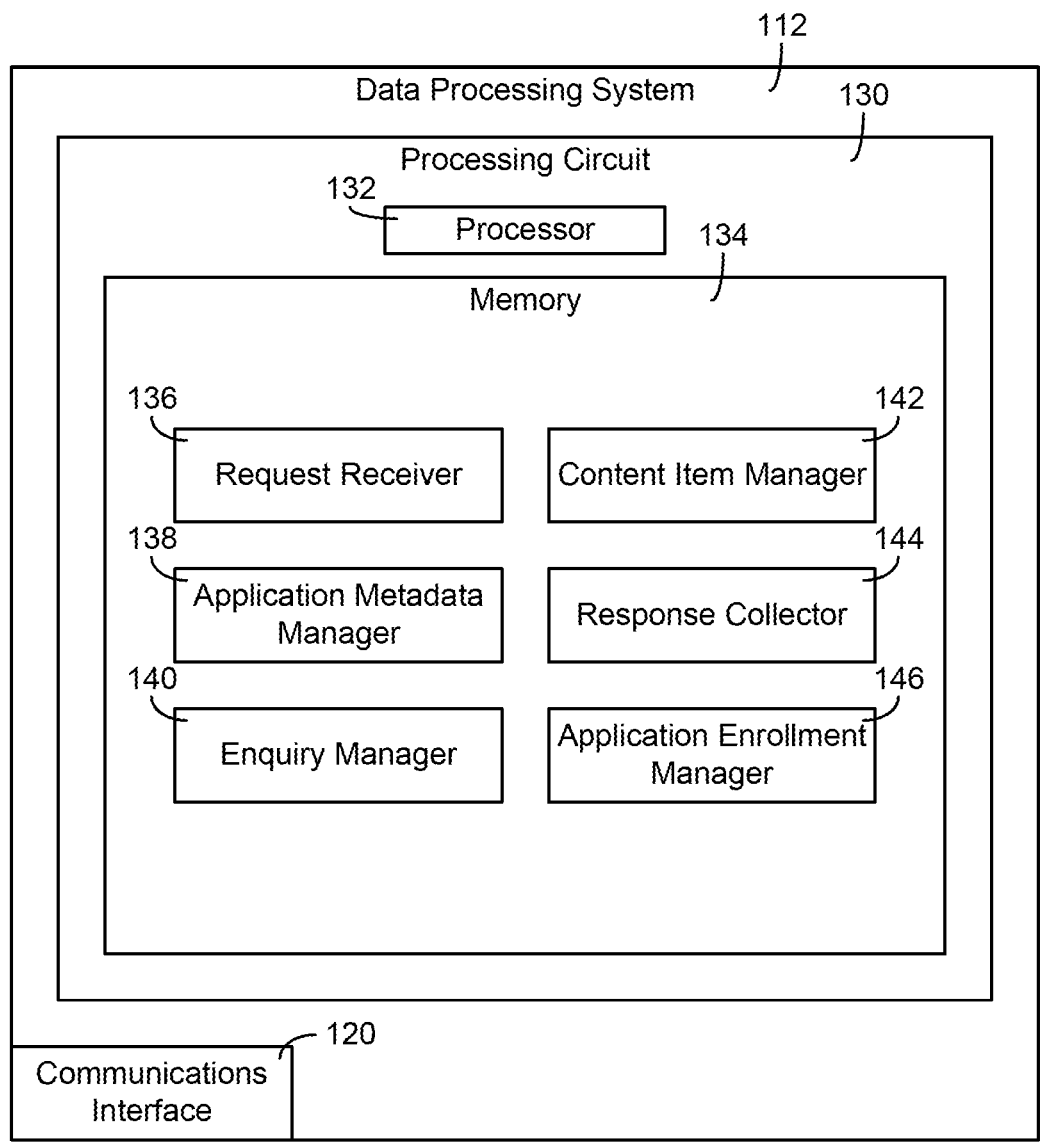
FIG. 2 is a block diagram illustrating the data processing system of FIG. 1 in greater detail, according to an implementation.

Referring now to FIG. 2, a block diagram illustrating the DPS is shown, according to an implementation. DPS 112 can include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 120 can allow DPS 112 to communicate with components of the computer system 100, such as network 102, resources 104, content providers 106, user devices 108, and data storage devices 110. For example, communications interface 120 may allow DPS 112 to receive or retrieve communication from user devices (e.g., user devices 108), user information from data storage devices (e.g., data storage devices 110), application metadata provided by content providers 106, or resources provided by content publishers. Communication interface 120 can allow DPS 112 to transmit or provide data to components of the computer system 100, such as providing generated content items to content slots provided by content publishers 114, transmitting performance metric (e.g., conversion rate or historical user interaction with content items) to content providers 106, providing notifications, content items, or network applications to user devices 108, or transmitting data to store or update data storage devices 110.

Communications interface 120 may be configured to receive metadata (e.g., metadata 118) from content providers 106 and/or data storage devices 110. The metadata can include, for example, application images (e.g., thumbnail images, low/medium/high-resolution images, alternative application images, etc.), application details (e.g., application summary, description of the application, release date, reviews, categories of the application, etc.), and/or other information from field-value pairs of the application metadata. In some implementations, the content providers 106 can provide additional information to incorporate when generating one or more content items, such as a custom logo, icon, image, or background representing the content providers 106 (e.g., business or company icon).

Communications interface 120 may be configured to receive user information from user devices 108 and/or data storage devices 110. User information may include, for example, user-specific information (e.g., user demographics, user preferences, user behavior data, etc.), contextual information (e.g., user location, web page context, recent page views, etc.), keyword information (e.g., keywords associated with a particular web page or search query, etc.), and/or other information which may be used by DPS 112 to generate or select enquiries and corresponding choices of responses which are relevant or interesting to a particular user or user device 108 or applications used by the user or the user devices 108 (e.g., enquiries relevant to applications installed on the user device 108 or enquiries directed to user preferences when looking to install a new application on the user device 108). The application metadata can be stored on the data storage devices 110 or content provider devices of content providers 106. The application metadata can be updated in real-time, every cycle (e.g., check updates every 10 minutes, 1 hour, etc.), or responsive to DPS 112 requesting application metadata to generate enquiries or responses. With any application metadata updates, content providers 106 can communicate with data storage devices 110 to update the stored metadata, if stored on the data storage devices 110. In some implementations, application metadata can be stored locally on content provider devices, such that the DPS 112 can retrieve or request metadata from the content providers 106.

DPS 112 can include at least one processing circuit 130. The processing circuit 130 can include a processor 132 and memory 134. DPS 112 can perform features and functionalities of the processing circuit 130, processor 132, or memory 134 described herein. Processor 132 may be implemented as a general-purpose processor, an application-specific integrated circuit (ASIC), one or more field-programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 can include, but is not limited to, a request receiver 136, application metadata manager 138, enquiry manager 140, content item manager 142, response collector 144, and application enrollment manager 146. Components of the memory 134 (e.g., request receiver 136, application metadata manager 138, enquiry manager 140, content item manager 142, response collector 144, or application enrollment manager 146) can be in electrical communication with other components of the memory 134, such as to perform features and functionalities described herein, including at least generating or selecting enquiries and interactive elements, generating content items, determining enquiries or responses to include in the content items, determining the performance of content items, providing campaign information or statistics to content providers 106, etc.

Still referring to FIG. 2, and in greater detail, the request receiver 136 can be configured to receive requests from content publishers 114, content providers 106, user devices 108, or other components of the computer system 100. Request receiver 136 can receive a request for content from at least one of the user devices 108 or content publishers 114 providing content slots for content items. For example, request receiver 136 can receive a request from the user device 108 to access an application. The request to access the application can include at least rendering or displaying a user interface of the application, one or more content slots within the user interface, or displaying a page within the application. Receiving a request to access the application can include a request for a content item, for example. Further, the resources 104 can include a configuration of content slots, such as a time interval to refresh contents of the content slots, a time interval to display a content slot (e.g., interstitial content slot or notification content slot), or when to disable visibility or terminate a content slot. The content publisher 114 can adjust the configuration of types of content slots to provide in the application, the number of content items allowed to be displayed, time interval to refresh or display contents, etc.

In another example, a user device 108 can access an application managed by a content publisher 114 using data from resources 104 to update or execute the application. Subsequent to accessing the application, the user device 108 can display a user interface of the application. The user interface of the application can include one or more content slots. To populate the content slots, request receiver 136 can receive at least one request from content publisher 114 for one or more content items to render in the content slots. In some implementations, the request receiver 136 can receive a request to access an application or web page and a request for content simultaneously or concurrently to render or display the user interface of the application or the web page with one or more content items.

Content slots can be embedded into the user interface of an application. Content slots may not be embedded into the user interface, such that the content slots can be removed, replaced, or moved to a different position on the user interface. Content slots can be configured to appear or disappear, such as enabling or disabling the visibility of the content slots (e.g., which in turn enable or disable the visibility of content items in the respective content slots). For example, the content slot can be an interstitial content slot to render an insterstitial content item. An interstitial content item can cover the majority of the user interface of the application displayed on the user device 108. The majority can refer to 70%, 80%, or 90% of the user interface (e.g., in a window rendered on the display of the user device 108). In some implementations, content slots can be banner-type or notification-type content slots, which can appear at a predetermined time after accessing the application, such as 30 seconds, 1 minute, 5 minutes, etc. The content slots can appear at the top, on the side(s), at the bottom, or at other positions on the user interface. In some implementations, content items or content slots can be, or be at least in part, transparent when rendered for display over a portion of the user interface. For example, content publisher 114 can configure content slots (e.g., and content items to be rendered in the content slots) to be transparent with a level of opacity, such as 80%, 70%, 60%, etc. The level of opacity can be configured by the content publisher 114. The opacity of content slots can be reflected in the opacity of content items displayed in the respective content slots.

The request receiver 136 can receive a request from content providers 106 for campaign status or performance of content items generated using application metadata provided by content providers 106. For example, request receiver 136 can receive a request from content providers 106 to generate a report (e.g., summary report or overview) of campaign performance. In response to the request receiver 136 receiving the request, request receiver 136 can communicate with content item manager 142, response collector 144, or other components of DPS 112 to generate a summary report of at least conversion events, conversion rates, installation rate, campaign cost, among other performance data of content items generated using application metadata from the respective content providers 106.

In some implementations, the request receiver 136 can receive a request for content from the user device 108 or the content publisher 114. The request for content can include an identification of a second application including a content slot within which to present at least one content item. The identification of a second application can be different from the identification of a first application, which can be the application executing on the user device 108. The first application can be from a content publisher 114 (e.g., data of the first application can be from the resources 104), and the second application can be from a content provider 106, such as application 116.

The request receiver 136 can receive a request to access information resource from the user device 108. The information resource can refer to data storage device 110, application page, store page, or accessing data of application 116 from a content provider 106. For example, a content item can include a link to redirect the user device 108 to an installation page for installing a second application or to directly install the second application responsive to receiving an interaction by the user device 108. Therefore, request receiver 136 can receive a request to access information resource from the user device 108 to install an application 116 of the content provider 106 upon user interaction to a link presented in the content item.

The application metadata manager 138 can access or retrieve metadata of one or more applications (sometimes generally referred to as application metadata) available for installation. The application metadata can be stored in data storage devices 110 or on a local device of a content provider 106. The metadata can include various field-value pairs, where the values (e.g., description, data, etc.) for each field can be provided, configured, or indicated by the content provider 106. The metadata can be associated with the content provider 106. The application metadata manager 138 can retrieve the metadata for other components (e.g., enquiry manager 140 or content item manager 142) of the DPS 112 to use for generating enquiries, responses, or content items, for example, for content items to render in content slots and display on user devices 108. In some implementations, application metadata manager 138 can access metadata of applications installed on user devices 108. DPS 112 can use the metadata of the installed application, in part, to launch or provide access to user devices 108, where the application can include content slots for rendering content items. In this case, the metadata can be provided or configured by content publishers 114.

The application metadata manager 138 can receive metadata updates from content providers 106. For example, application metadata manager 138 can receive inputs from devices of content providers 106 configuring values in the field-value pairs. In response to saving or applying the changes, the application metadata manager 138 can propagate or forward the updated field-value pair(s) from content providers 106 to any storage devices maintaining the outdated metadata of applications (e.g., data storage devices 110 or metadata 118). Therefore, when retrieving the metadata of an application, DPS 112 can generate content items with up-to-date enquiries and response information. For example, if the metadata of an application is stored in a database used for a store page or an installation page, the application metadata manager 138 can transmit the updated metadata corresponding to the application to the database, thereby updating application information in the store page.

The application metadata manager 138 can monitor traffic to a store page or an installation page. The traffic to the installation page can include at least visits, views, downloads/installations, timestamps (e.g., time of visit, download, views, etc., including peak time or off-peak time), among others. Application metadata manager 138 can monitor the traffic of users accessing or being redirected to the store together with content items rendered to user devices 108. For example, the application metadata manager 138 can gauge conversion rate (e.g., click-through rate) or performance of the content items to have users visit the installation page or download applications of content providers 106.

The application metadata manager 138 can determine a priority level of each field-value pair. The priority level of the field-value pairs can be based on a likelihood of interaction with content items when using the field-value pairs as enquiries or responses, based on field-value pairs that can be used for generating engaging (or notable) enquiries or responses, or based on relevancy to the user (e.g., the context of applications or web pages the content items will be presented in). For example, the application metadata manager 138 can determine the likelihood of interaction for content items based on historical interaction data indicating field-value pairs used to generate content items and interaction rate (or conversion rate) of the content items determined by recording user interactions with the content items. In another example, the application metadata manager 138 can identify field-value pairs, such as name (or title), image, keywords, categories, version, or rules/policies of an application. The application metadata manager 138 can prioritize the field-value pairs that users would likely have knowledge or understanding of, such as image, name, keyword (e.g., used to search for the application in a store page), or categories. The prioritization of one or more field-value pairs can, at least, indicate the engagement level, comprehensibility, or notability of an entry (e.g., enquiries or responses) when using the field-value pairs to generate content items. In some cases, the version of the application may not be prioritized to generate enquiries or responses, since most users may not know the specific version of the application of the content provider 106, for example. In some other cases, application metadata manager 138 can prioritize the version of the application for generating an enquiry or one or more responses.

The application metadata manager 138 can generate a performance metric or report for content providers 106 or content publishers 114. In some implementations, the application metadata manager 138 can generate a performance metric or report for content providers 106 or content publishers 114 based on the performance of content items, For example, for content providers 106, application metadata manager 138 can generate a report indicating at least a number of content items provided for rendering or display, conversion rate (e.g., visits to application site after viewing at least one content item), installation rate (e.g., user installation after presented with at least one content item), a list of enquiries and responses used for generating content items, the performance of each enquiry and responses pair (e.g., engagement or participation rate with each enquiry), among other aggregated summaries. The application metadata manager 138 can transmit the generated report to content providers 106 either upon request (e.g., received from a respective content provider 106) or at a predetermined cycle (e.g., daily report, weekly report, monthly report, etc.). For example, application metadata manager 138 can generate and transmit a performance report for content publishers 114 indicating a count of content items rendered in content slots within a time (e.g., daily, weekly, monthly, etc.), the bid provided to render the content items (e.g., the total amount from content providers 106), or rewards distributed to users (e.g., user accounts or user devices 108 successfully interacting with the content items).

The enquiry manager 140 can be referred to as an entry manager, enquiry generator/selector, or response generator/selector. Enquiry manager 140 can determine one or more entries associated with the application from the content provider 160. The entries can be based on the metadata of the application. The entries can include at least one or more enquiries and corresponding one or more responses. The responses can be referred to as choices, interactive elements, selectable item, or predetermined buttons which corresponds to the enquiries. Each enquiry can correspond to multiple responses. Users can provide a response (e.g., reply to the enquiry) by selecting, using their user devices 108, at least one of the responses.

For example, the enquiry manager 140 can select or generate enquiries and corresponding responses based on field-value pairs of the metadata. Using image and name field as an example, the enquiry manager 140 can generate an entry having an enquiry of "what is the name of this application?" while being displayed an image associated with the application. The enquiry manager 140 can generate responses corresponding to this enquiry, such as the correct name of the application and at least one name of other similar applications. The enquiry manager 140 can group the generated set of enquiries and responses into an entry. In another example, the category field of the metadata, the enquiry manager 140 can generate enquiry of "what is one of the genres of 'name of the application'?" The enquiry can be rendered or input into a content item with an image of the application. The enquiry manager 140 can generate a response having at least one value from the category field of the application metadata and other responses with values not included in the value field of the application metadata. For example, if the value of the category includes action and mystery, the enquiry manager 140 can generate responses with values: action, adventure, space, puzzle, and simulation. In some implementations, the enquiry manager 140 can store generated entries in a database (e.g., data storage devices 110). If stored in the database, the enquiry manager 140 can select or retrieve entries from the database responsive to receiving a request for content from the user device 108 or content publishers 114, for example. In some other implementations, the enquiry manager 140 may not store generated entries in a database. Instead, the enquiry manager 140 can generate entries upon receiving a request for content.

The enquiry manager 140 can identify the performance history (e.g., performance metric or historical statistics of the entries) of each enquiry. For example, enquiry manager 140 can determine entries (e.g., enquiries or responses) used to generate content items. For each entry (e.g., each enquiry or responses corresponding to the enquiry), the enquiry manager 140 can determine the number of correct or incorrect responses provided by users. High incorrect responses (e.g., 80%, 90%, 95%, etc.) can indicate that an enquiry (or predetermined responses) may be confusing or unclear, too difficult, or not interesting or relevant to the users. High correct responses may indicate that the enquiry (or predetermined responses) is not challenging, apparent to the user, or self-explanatory. In some implementations, the enquiry manager 140 may not choose or select entries with high incorrect responses. In some implementations, the enquiry manager 140 may select entries with high correct responses. In some other implementations, the enquiry manager 140 can select entries with a moderate level of correct or incorrect responses (e.g., 60%, 70%, or 75% correct).

In some implementations, with a large number of incorrect responses, the enquiry manager 140 can forward the performance history to the content providers 106, for example, to update metadata information (e.g., if the information provided in the metadata was incorrect. Further, based on the performance history, the enquiry manager 140 can determine one or more entries to select or generate for rendering in content slots of an application. The metadata used to generate entries can be from a second application from content providers 106, not a first application from content publishers 114 providing content slots for rendering content items with enquiries and corresponding responses.

In some implementations, the enquiry manager 140 can receive one or more responses provided by user devices 108 from a response collector 144. The enquiry manager 140 can input the responses to a machine learning engine or machine learning model to determine the next entry (or enquiry and responses) to use. The machine learning model can be referred to as a selection model for selecting enquiries or corresponding responses based on interaction data from user devices 108. For example, the enquiry manager 140 can input user response history to entries into a machine learning model. The machine learning model can be trained using training data samples (e.g., sample data of historical enquiries and responses and selection of users). The machine learning model can output an indication of a performance level for each enquiry (e.g., conversion rate, correct selection of responses, etc.), which can be ranked or listed as a report. Based on the performance level for each enquiry and responses pair, the enquiry manager 140 can prioritize the use of one or more entries over others to increase the engagement of users towards content items. Prioritizing entries can refer to the DPS 112 selecting or generating the entries more frequently to generate content items for rendering in content slots. In some implementations, based on the performance level of each entry, the enquiry manager 140 may not generate, retrieve, or provide one or more entries for the content item manager 142 to generate content items with. The enquiry manager 140 can prioritize (or tag a higher rank for) entries with a higher performance level. Based on the prioritization of the entries, the enquiry manager 140 can determine which entry to generate or select for the content item manager 142. In some cases, based on the prioritization, the enquiry manager 140 can determine which entry not to generate or select for the content item manager 142.

In some implementations, the enquiry manager 140 can select or generate enquiries or responses personalized to the user or user device 108. For example, the enquiry manager 140 can use a selection model (e.g., trained by a machine learning engine using one or more machine learning techniques) to determine the types of entries the user is likely to interact with. The selection model can be trained with interaction data from various users associated with various content items generated from different application metadata, such as a ratio of user interaction with the content item based on types of field-value pairs used, types of applications (e.g., action, puzzle, mystery, adventure, simulation, etc.), number of selectable responses provided, font size for enquiries and responses, among other formats and configurations of content items of applications. The selection model can receive or be trained with interaction data of the user from user device 108 to determine the preferences or types of content items the user is likely to interact or convert with. Accordingly, the enquiry manager 140, using the selection model, can select an enquiry and responses from the database personalized (or specialized) for the user based on interaction data. As such, the enquiry manager 140 can provide the entries to content item manager 142 to generate content items that can convert from user interaction.

The content item manager 142 can select or generate content items including at least a subset of the one or more entries and an actionable object. The actionable object can be a link or a hyperlink, for example, that links to an application of the content provider 106 for installation. For example, subsequent to receiving an indication of interaction from the user device 108, DPS 112 can redirect the user device 108 to access a store page or installation page associated with the application of the content provider 106. In some cases, the actionable object can be a script, which when selected by the user device can cause the user device to access an information resource. From the information resource (e.g., store page in a web browser), the user device 108 can install the application associated with the content item and/or the actionable object.

The content item manager 142 can generate content items based on entries (e.g., enquiries and corresponding responses) determined, selected, generated, or provided by the enquiry manager 140. Content item manager 142 can format the content item based on the type of content slot for rendering the content item. For example, the content item manager 142 can shrink the sizes of the entries (e.g., enquiries, responses, or images) to fit with a banner-type content slot or enlarge the sizes of the entries to cover an interstitial-type content slot. Content item manager 142 can configure the arrangement and appearance of content items based on other types of content slots (e.g., notification content slots, playable content slots, etc.), such that content items look natural (e.g., similar theme, color, font, text size, or seamlessly inserted) to the application or web page. Content item manager 142 can customize the arrangement of the entries in any configuration to fit with the content slot and/or with the application or web page. In some cases, the content providers 106 can provide a template or specify the formatting of the content item, such that the content item manager 142 can insert the entries according to the template to generate content items. Content item manager 142 can transmit content items to the user device 108, where the user device 108 can display the content item. Content item manager 142 can transmit content items to content slots provided by content publishers 114, where the content slots with content items can be provided to user devices 108.

The content item manager 142 can select based on an identification of the second application. For example, content item manager 142 can retrieve entries from a database generated using metadata of the second application (e.g., application of content provider 106). Content item manager 142 can select content items with enquiries and corresponding responses having information related to the second application. In the case of selecting the responses, the content item manager 142 may select one or more responses with information not included in the metadata of the application, which can indicate an incorrect response if the user selects these responses. Content item manager 142 can include a link or a hyperlink in the content item retrieve from the application metadata. The link or the hyperlink may be referred to as the actionable object to redirect the user device 108 to an information resource for installing the second application, for example.

The content item manager 142 can select the subset of the one or more entries for inclusion in the content item. The subset can refer to at least one entry from a list of entries to include as an enquiry and responses. To select an entry, content item manager 142 can identify a priority of each field from the field-value pairs of the metadata of the application. The priority of each field can be set by the enquiry manager 140 or other components of the DPS 112 described herein. For example, the priority of each field can be based on a number of values associated with the field (e.g., category field can include 2-10 values, version field can include 1 value, name field can include 1 value, rule field can include above 5 values, keywords field can include at least 10 values, etc.). The priority of each field can be based on a number of incorrect (or correct) responses previously received from user devices 108 to which content items including enquiries for the field. For example, when selecting a field for the enquiry and responses used for content items, each incorrect selection provided by at least one user can reduce the rating or priority of the field. On the other hand, when at least one user provides a correct selection of the responses for a content item with a field, the rating or priority of the field can increase for content item manager 142 to select the entry for inclusion in the content item.

In some implementations, the content item manager 142 can manage the visibility of the content item. For example, content item manager 142 can enable visibility of a content item to render on the user device 108. In response to receiving a correct response from the user device 108, content item manager 142 can disable the visibility of the content item or the content slot rendering the content item. In some implementations, if the user device 108 transmit an indication of a selection of an incorrect response, content item manager 142 can enable visibility or provide hints for rendering on the display device of the user device 108. The hints can appear in the content slot rendering the content item. Content item manager 142 can maintain visibility of the content item for reattempt by the user. In some implementations, content item manager 142 can provide a second content item responsive to receiving at least one incorrect response (e.g., may provide a second content item after multiple attempts). For example, content item manager 142 can select a second entry or a second subset of one or more entries for inclusion in the content item (e.g., which can replace the previous enquiry and responses). In some cases, content item manager 142 can maintain the same enquiry but select one or more different responses, such as for a second user attempt. Content item manager 142 can rearrange or shuffle the responses, such as in response to an incorrect selection of a response.

In some implementations, the content item manager 142 can select a subset of the one or more entries for inclusion in the content item using a selection model. For example, content item manager 142 can train the selection model using interaction data (e.g., interactions with content items having enquiries and corresponding responses) from user devices 108 as inputs or training dataset. Based on the interaction data, the selection model can output the performance of each field of the field-value pair for generating or selecting enquiries (or responses). The selection model can rate or configure the priority of each field for content item manager 142 to include in content items. According to the output of the selection model, content item manager 142 can select a subset of entries based on, for example, at least one of the performance, the priority, among other information of the entry.

In some implementations, the content item manager 142 can include one or more scripts in the content item. The script can execute on the user device 108, such as responsive to (e.g., 1 millisecond ("ms"), 10 ms, 50 ms, or shortly after) the content item is rendered in the content slot or display on the user device 108. The script can cause the user device to perform features or functionalities described herein. For example, the script can cause the user device 108 to present the subset of the one or more entries within a content slot, such as at least one enquiry and various responses corresponding to the enquiry. The script can cause the user device 108 to detect interaction data from selection of one or more interactive elements associated with the subset of the one or more entries. The selection can be initiated or provided by a user of the user device 108. The script can cause the user device 108 to provide the interaction data detected from the selection of the one or more interactive elements within the content slot to the DPS 112. Transmitting or providing data to the DPS 112 can refer to transmitting data to at least one component (e.g., request receiver 136, application metadata manager 138, enquiry manager 140, content item manager 142, response collector 144, or application enrollment manager 146) of the DPS 112.

The content item manager 142 can include a terminate icon or object in the content item. The content item manager 142 can configure a time for when this object can be visible or enabled for interaction to the user device 108. For example, the terminate icon can appear after a predetermined time period after rendering the content item, such as 10 seconds, 12 seconds, 15 seconds, etc. In some cases, content item manager 142 can include the terminate icon with other elements of the content item, such as to be displayed with other elements of the content item (e.g., enquiry, image, interactive elements, etc.). Content item manager 142 can terminate or disable visibility of the content item responsive to user interaction with the terminate icon.

In some implementations, content item manager 142 can include or provide an image corresponding to a reward (e.g., an incentive for participating or interacting with the content item) in the content item. The reward can be presented to the user device 108 in response to the DPS 112 receiving a selection of a correct response rendered in the content item. The content item manager 142 can include a script in the content item that can cause the user device 108 to detect first interaction data from a selection of one or more interactive elements (e.g., responses) associated with the subset of the one or more entries. The interactive elements associated with the subset of entries can refer to the interactive elements corresponding to the enquiry included in the content item. In some implementations, the script can cause the user device 108 to determine that the selection indicate an incorrect response or selection of an interactive element. The script can cause the user device 108 to provide a notification to the user device 108 (e.g., the display device electrically connected to the user device 108) indicating that the selection is incorrect. In some implementations, the script can cause the user device 108 to detect second interaction data from selection of other one or more interactive elements associated with the subset of the one or more entries. The script can cause the user device 108 to determine that the selection is correct or that the selection indicate a correct interaction element. The script can cause the user device 108 to present the image corresponding to the reward responsive to determining that the second interaction data corresponds to the correct response. After presenting the reward, the DPS 112 can communicate with the resources 104 or the content publisher 114 managing the application providing content slots for rendering content items to the user device 108. DPS 112 can indicate that the user provides a correct response to the content item. DPS 112 can retrieve or receive a reward from resources 104 or the content publisher 114 to provide the user account concurrent or responsive to rendering the image of the reward. The type of reward provided to the user can vary depending on the application the content slots are presented in or based on configuration by content publishers 114. In some implementations, DPS 112 can perform one or more features and functionalities of user devices 108 initiated by the script included in the content item, such as determining whether the interaction data indicate a successful (e.g., correct) or unsuccessful (e.g., incorrect) selection of an interactive element associated with an entry.

In some implementations, content item manager 142 can include a script in the content item which can cause the user device 108 to transmit an instruction to a content provider 106 providing the application metadata used to generate the entry included in the content item, responsive to determining that the correct interactive element is selected. For example, the instruction transmitted to the content provider 106 can include an update to a value corresponding to a performance metric of the content item generated using metadata of an application from the content provider 106. By transmitting the update to the value, the content provider 106 can be notified, for example, of the performance for each field used for generating content items, an updated conversion rate, user devices 108 installing the application after presented with the content item, users' impression of content items based on metadata of the content provider 106, or other information/reports that can be presented to the content provider 106.

The response collector 144 can receive inputs or responses from the user devices 108. For example, response collector 144 can receive an input indicating a selection of an interactive element of the content item (e.g., predetermined response rendered in the content item). Response collector 144 can receive a selection of an actionable object included in the content item (e.g., for redirecting user device 108 to an application page or installation page). Response collector 144 can receive an input that may correspond to a correct interactive element associated with the content item or that may correspond to an incorrect interactive element associated with the content item. Response collector 144 can receive an input indicating a selection corresponding to a pixel location or position on the content item rendered on the user device 108. Each interactive element can be associated with a group of pixels rendered in the content slot as part of the content item. In this case, receiving a selection of an interactive element can refer to receiving an input (e.g., button press at mouse pointer location, finger press or tap, etc.) at a pixel location corresponding to a group of pixels associated with an interactive element. Accordingly, response collector 144 can identify the interactive element selected by the user device 108.

The response collector 144 can receive an input from the user device 108 to terminate, close, or disable visibility of the content item from being displayed on the user device 108. For example, content items can include a terminate button, icon, or element. Response collector 144 can receive an input from the user device 108 indicating a selection of the terminate button. Accordingly, DPS 112 can terminate or disable the visibility of the content item responsive to receiving this input. Inputs received by the response collector 144 can be referred to as interaction data from user devices 108.

The response collector 144 can receive interaction data (e.g., input, selection, or an indication of user engagement) from user devices 108 indicating a selection of an interactive element of various interactive elements corresponding to an entry or an enquiry. Response collector 144 can determine whether the interaction data indicate a correct response or an incorrect response to the enquiry. Based on whether the response is correct or incorrect, response collector 144 can update a selection model for selecting one or more entries for generating subsequent content items, such as selecting entries based on the interaction data from user devices 108. For example, based on the interaction data, the selection model can select one or more entries with a moderate amount of users selecting correct responses (e.g., 70%, 75%, or 80% correct response). In some cases, the selection model can select one or more entries based on a high amount of incorrect responses received from users, such as to increase user understanding of the application or to determine whether to notify the content provider 106 of potential misinformation in the metadata used to generate the content item, for example.

The response collector 144 can transmit the response or interaction data received from user devices 108 to other components of the DPS 112. For example, response collector 144 can transmit interaction data to enquiry manager 140 to generate or select one or more enquiries based on the fields users are likely to interact or engage with. Further, response collector 144 can transmit the interaction data to the enquiry manager 140 to determine or update the priority of each enquiry or identify the performance of the fields. Response collector 144 can transmit interaction data for content item manager 142 to select one or more entries to include in content items based on the performance of each entry, priority of the entries, among other performance metrics of the past content items and interactions by users. In some implementations, response collector 144 can transmit the interaction data to application enrollment manager 146 to determine an amount to charge the content provider 106, an amount to deliver to content publisher 114, etc.

The application enrollment manager 146 can manage enrollment or registration of content providers 106 or content publishers 114 to the service, features, or functionalities provided by the DPS 112 (e.g., generating content item based on metadata from content providers 106 or presenting the content items in content slots provided by content publishers 114. By enrolling in the service, DPS 112 can be granted access to metadata of applications managed by the content providers 106 that are enrolled. Further, by enrolling in the service, DPS 112 can publish or provide generated content items to available content slots provided by the content publishers 114. With the enrollment, the content publishers 114 can configure what rewards to provide after the users successfully responded to the enquiry of the content item. Content publishers 114 can configure the type of content slot, frequency of providing content slots, times to provide content slots, etc.

In some implementations, the application enrollment manager 146 can be referred to as a reward manager. The application enrollment manager 146 can provide rewards to users. For example, the application enrollment manager can provide a reward to user device 108 or user account responsive to receiving a correct response from the user device 108. To provide the reward, application enrollment manager 146 can request the reward from the content publisher 114 to be presented or input in the user account associated with the user providing the correct response (e.g., correct selection of an interactive element in the content item). In some implementations, DPS 112 may provide a reward to the user after continuous attempts from the user, such as based on a predetermined time (e.g., 2 minutes, 5 minutes, 7 minutes, etc.) or a number of attempts (e.g., 3 attempts, 5 attempts, etc.).

For example, if the user interacts with the content item (or various content items) for a predetermined time, DPS 112 can provide a reward for the user's effort in attempting to respond to the enquiry, even if the responses are not correct. In another example, DPS 112 can provide a reward after multiple attempts by the user to provide the correct response. In some implementations, DPS 112 may not provide any reward unless the user provides a correct response or select a correct interactive element associated with the entry. In some implementations, even after the predetermined time or attempts, if the user shows no effort in attempting to provide a correct response (e.g., rapid clicks after a second content item is provided, repeatedly clicking on the same interactive element, or lack of mouse movement), DPS 112 may not provide a reward to the user. The rewards can be provided to the respective application executing on the user device 108. In some implementations, to present the rewards, a script included in the content item can execute on the user device 108, such that the user device 108 can display the reward. The script can be executed responsive to any of the above conditions discussed above for providing the reward.

Thus, by generating enquiries and responses from metadata accessible to the DPS 112 and generating content items using the metadata, the DPS 112 can reduce resource consumption (e.g., reduce the amount of data stored in a database to generate content items), reduce network traffic or network congestion (e.g., the amount of data transmitted to and received from the content provider 106), and reduce time consumption for content providers 106 (e.g., no need for content providers 106 to generate such enquiries and responses, arrange the content for content items, or update their inventory of enquiries and responses).

Referring now to FIG. 3, an example table of a field-value pair of application metadata is shown, according to an implementation. Table of field-value pairs can be used, configured, or otherwise maintained by one or more components of the system 100 (e.g., resources 104, content providers 106, user devices 108, data storage devices 110, DPS 112, or content publishers 114) in conjunction with FIGS. 1-2, or any other computing devices described herein. Table 300 can include various field-value pairs from the metadata of an application. The application can be managed by content providers (e.g., content providers 106) or content publishers (e.g., content publishers 114). In this example, the table 300 can include field-value pairs of the metadata of an application from a content provider (e.g., metadata 118 of application 116). The table 300 can include various fields 302A-N (sometimes referred generally as field(s) 302) and the associated values 304A-N (sometimes referred generally as value(s) 304).

For example, the fields 302 can include at least name, categories, keywords, image, description, URL, rules (or policies), application size, number of downloads, latest version update, among others. Each field 302 can include a corresponding paired value. The value of the name field can include various characters or text identifying the name of the application (e.g., "Duty of Call"). The values of the categories can include a list of genres or categorizations of the application (e.g., action, adventure, puzzle, mystery, 3D, simulation, First Person Shooter ("FPS"), multiplayer online ("MMO"), co-op, romance, role-playing ("RPG"), among others). The values of the keywords field can include one or more terms that one or more user devices (e.g., user devices 108) can input in attempting to find the application, such as in the resources (e.g., resources 104), web site, application store, or other locations online (e.g., "duty call," "duty of call," "call duty," "action call," etc.) The values of the image field can include image data or files, such as one or more JPG, PDF, GIF, among other image files for downloading and rendering the image of the application (e.g., profile image, background image, etc.). The values of the description field can include a text description of the application generated or provided by the administrator or developer of the application (e.g., the content provider or the content publisher). The text description can include a short summary detailing the story or type of application when executing the application. The value of the URL field can include one or more links to at least one of a store page, an installation page, the web page of the application, or other pages or sites associated with the application, for example.

In further example, the value of rules or policies field can include various descriptions of the rules for using the applications, such as how to navigate through the user interface of the application, user agreement and privacy policy associated with installing or using the application, rules (or controls, instructions, or key binds) for utilizing the application or controlling elements (e.g., characters or items) within the application, among other rules guiding users to properly use the application. The value of the application size filed can include a numerical value indicating the file size or disk space consumption when downloading or installing the application (e.g., size of compressed or uncompressed file). The value of the number of downloads can include a numerical value indicating total user profiles that downloaded the application, total users purchased and downloaded the application, total user devices that the application is downloaded or installed to, among other variables which can be used to determine the number of downloads (e.g., re-installation or re-download from the same user profile or user device may or may not count as additional recorded download). The value of the latest version update field can include the current version number of the application. The version number can be updated by the content provider responsive to releasing an update to the application installation file (e.g., releasing update files to the application page or store page for users to install prior to using the application).

The field-value pairs discussed herein can be updated by the content providers, such as by updating the metadata of the application provided to the store page where the application can be downloaded or installed from. Any update made to the application metadata can be reflected in the filed-value pairs, where at least some field-value pairs can be displayed in the application page, such as at least the name, categories, image, description, application size, number of downloads, or current version number of the application, among others.

One or more components of the system 100 (e.g., DPS 112) can utilize the field-value pairs of the metadata to generate one or more enquiries, corresponding responses, or content items, as discussed herein. For example, the name field-value pair (sometimes generally referred to as pair) can be used by DPS to generate an enquiry of "what is the name of this application?" while rendering an image of the application from the image pair. With the generated enquiry, the DPS can generate multiple corresponding responses including at least an interactive element with the value from the name pair (e.g., "Duty of Call") and other interactive elements with names of other applications (e.g., "Fire App," "Field Duty," etc.). The other names of other applications can be selected, for example, based on the other applications having one or more similar pairs, such as similar categories, keywords, names, developers, etc. In some implementations, the selection of other names used for the other applications can be performed randomly by the DPS. In some implementations, similar techniques can be performed for selecting other interactive elements to include as part of the responses, such as when using other field-value pairs for generating enquiries.

In another example, the DPS can utilize a combination of name and categories pair to generate an enquiry of "what are the categories of [name] application?" Using the categories pair, the DPS can generate various corresponding responses including at least one value from the categories pair and one or more values not from the categories pair. The DPS can use the generated enquiry and responses to generate a content item for rendering in a content slot in another application of a content publisher. If a user selects an interactive element with the value application metadata, the DPS can determine that the selection is correct. Otherwise, the DPS can determine an incorrect selection if the user interacts with other interactive elements having values not included in the application metadata or not included in the field-value pairs of table 300, for example. In some implementations, the DPS can select multiple values from the categories pair to include as part of the interactive elements. In these implementations, the DPS can receive multiple selections of interactive elements from a user device. The DPS can compare the selections to determine whether each interactive element corresponds to the values included in the metadata (e.g., indicating a correct selection) and whether all interactive elements generated with the values from the metadata have been selected (e.g., not selecting an interactive element can indicate an incorrect non-selection). If all correct interactive elements are selected and all incorrect interactive elements are not selected, the DPS can determine that the user selections are successful or satisfactory to complete the enquiry. Otherwise, the DPS can determine that the selections from the user are incorrect or partially incorrect. Accordingly, if incorrect (or partially incorrect), hints may be provided, or other content items can be generated or retrieved from the data storage devices (e.g., storage devices 110) to render on the user device.

Figure 4:
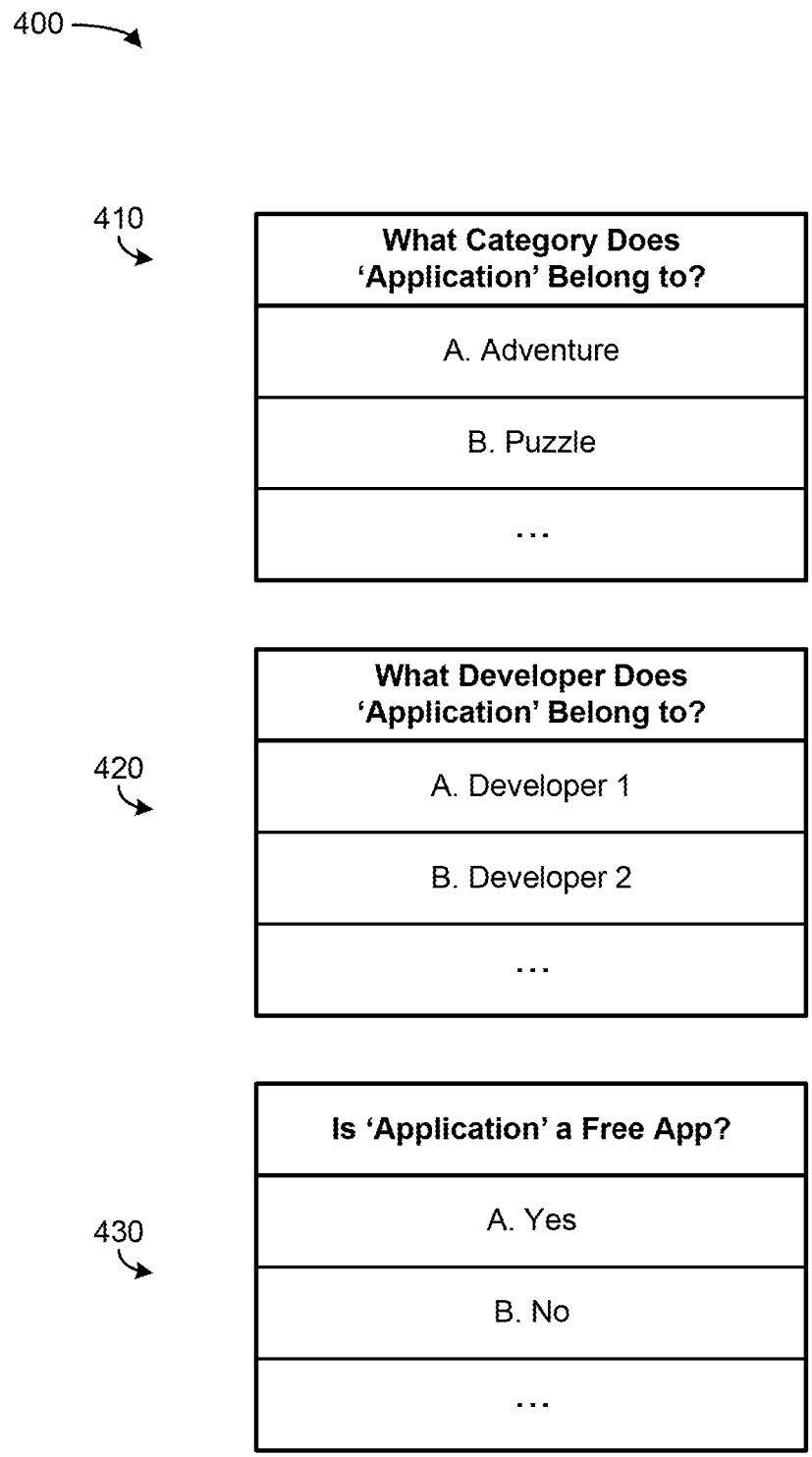
FIG. 4 is an example illustration of interactive-type content items, according to an implementation.

Referring to FIG. 4, an example illustration of interactive-type content items is shown, according to an implementation. The example operations presented or otherwise described to generate one or more elements in illustration 400 can be executed, performed, or carried out by one or more components of the system 100 (e.g., resources 104, content providers 106, user devices 108, data storage devices 110, DPS 112, or content publishers 114) in conjunction with FIGS. 1-2, or any other computing devices described herein. The example illustration 400 can include examples of content items, such as content items 410, 420, and 430. These content items (e.g., content items 410, 420, or 430) may be referred to as a first content item, a second content item, or a third content item when describing the example illustration 400.

Each content item described herein can be generated or selected by a DPS (e.g., DPS 112) using application metadata provided by or retrieved from one or more content providers (e.g., content providers 106). Each content item can include an enquiry and multiple corresponding responses generated by the DPS. At least one of the responses can correspond to a value paired with the respective field of the field-value pair from the metadata, while other responses may not correspond to the value from the field. The other responses may be values excluded or not included in the respective field-value pair from the metadata. The response can be interactive elements, such that upon rendered in a content slot, a user can interact (e.g., mouse press, a touch gesture, etc.) with the interactive elements (e.g., within pixel coordinates identifying each interactive element) to select at least one of the responses. Examples of the enquiries and corresponding responses that can be included in one or more content items can be described herein.

In some implementations, the content item 410 can be a quiz-type content item including one or more questions associated with one or more correct answers (or answers to choose from). For example, content item 410 can include an enquiry of "what category does 'Application' belong to?" In place of 'Application,' the enquiry can include the name of the application. The DPS can retrieve the name from the application metadata (e.g., data from the value corresponding to the name field). In this example, the DPS can use at least the category field as part of the content item 410. Since this enquiry indicated for the user to select a category (e.g., from a category field of the metadata), the DPS can include at least one value corresponding to the category field from the metadata in the content item 410. The DPS can include other values not included in the metadata, set as incorrect interactive elements or responses. For example, if the 'Application' has a category of puzzle and mystery, the DPS can include either a puzzle or a mystery as one of the responses (or interactive element). Other interactive elements may include categories that are not puzzle or mystery, such as adventure, action, among others.

Content item 420 can include an enquiry of "What developer does 'Application' belong to?" In this example, the DPS can include values from a developer field as part of the content item 420. Since the enquiry indicated for the user to select or identify the developer of the 'Application,' the DPS can select or generate at least one response with the developer associated with the 'Application,' and one or more other responses with the developer not associated with this 'Application' mentioned in content item 420. The application of content item 420 can be different from 410, based on the content provider the metadata is from.

Content item 430 can include an enquiry of "Is 'Application' a free app?" In this example, the DPS can include values from a price field (sometimes referred to as purchase field or cost field) as part of the content item 430. The value of the price field can include price data of the application, such as the amount to pay prior to downloading, installing, or otherwise utilizing features of the application. The DPS can include a "yes" or "no" response in this case. The total number of interactive elements can be set by the content provider or the administrator of the DPS. In some cases, the number of interactive elements can be based on the size of the content slot, such that the DPS can include less interactive elements (e.g., 2 or 3) in a smaller content slot or more interactive elements (e.g., 4 or more) in a larger content slot.

In some implementations, the DPS can include a "maybe," "skip," or "I don't know" as one of the responses or interactive elements that the user can select. For example, the DPS can include one or more alternative responses (or alternative elements) that can be common when considering any enquiries provided to the user. The alternative responses can include common replies that may be expected from users when providing any enquiry, such as a "maybe," "skip," "not sure," "next," among others. In response to one or more of these alternative responses, the DPS can determine whether to provide any additional content item for rendering to the user, terminate the content item, provide the reward associated with the content item (e.g., different content items may provide different levels of rewards) from a content publisher providing the content slot. For example, if the user selects a "maybe" interactive element, the DPS can provide a second content item to the user. A repeated selection of "maybe" interactive elements may terminate the content slot without the user receiving any reward if configured as such by the administrator, content provider, or content publisher. In another example, a selection of "not sure" may in some cases be a valid response, and the DPS can provide or execute a reward for the user in response to receiving the one or more interactive elements selection(s).

Figure 5:
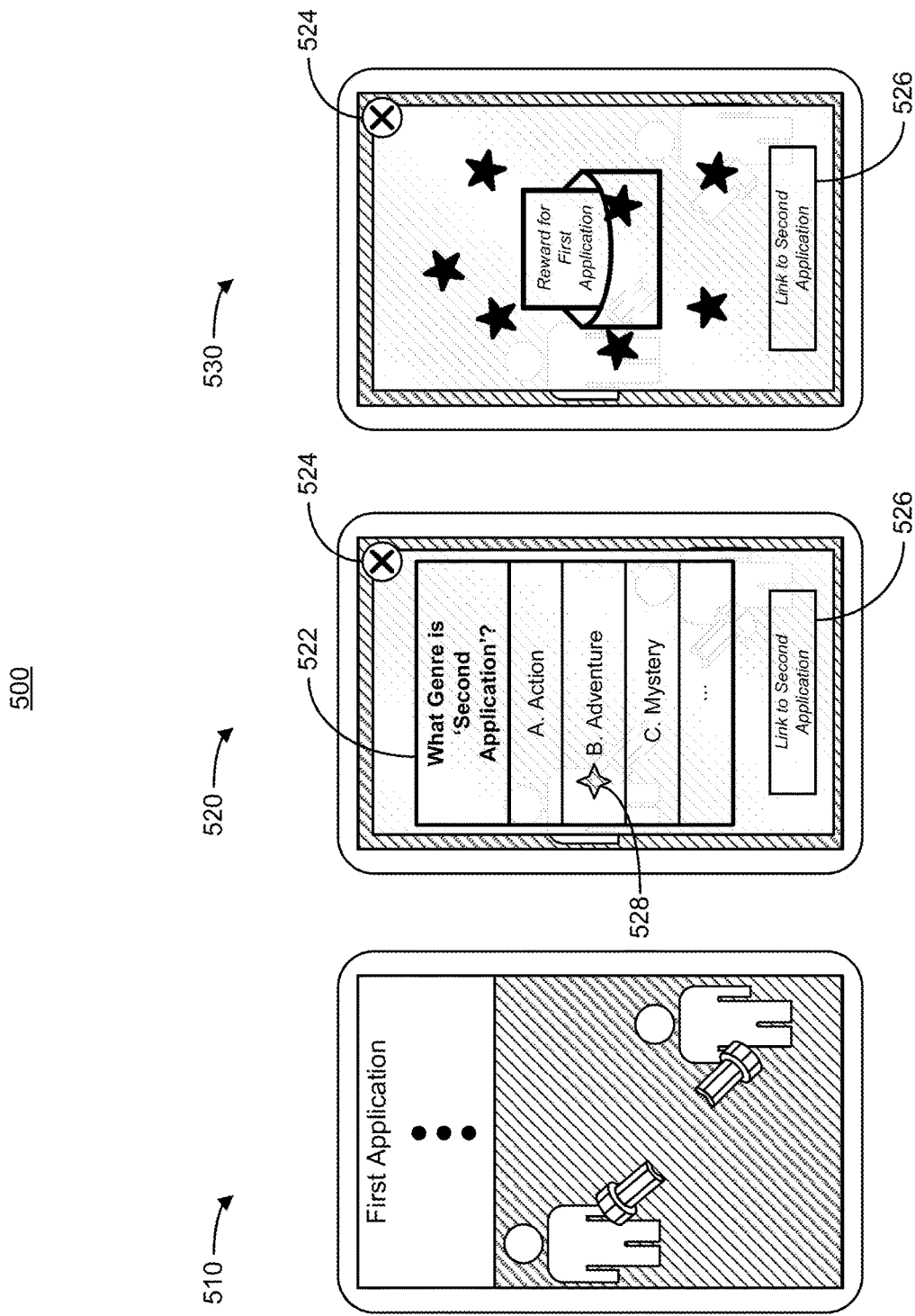
FIG. 5 is an example illustration of a client device rendering an interactive content item within a first application, according to an implementation.

Referring to FIG. 5, an example illustration of a client device rendering an interactive content item within a first application is shown, according to an implementation. The example operations presented or otherwise described to render, generate, or present one or more elements in illustration 500 can be executed, performed, or carried out by one or more components of the system 100 (e.g., resources 104, content providers 106, user devices 108, data storage devices 110, DPS 112, or content publishers 114) in conjunction with FIGS. 1-2, or any other computing devices described herein. The example illustration 500 can include a client device displaying a first instance 510, a second instance 520, or a third instance 530. Each instance may represent a state of the client device or a moment that the client device displays an application, a content item, or a reward interface. For example, the first instance 510 can include a client device rendering a first application. The second instance 520 can include the client device rendering a content item. The third instance 530 can include the client device rendering a reward interface.

In the first instance 510, a user of the client device can launch or access a first application. The first application can be rendered on a display of the client device (e.g., in fullscreen, borderless fullscreen, or windowed mode). The first application can be any application, such as an application installed locally on the client device, a web-browser application, a virtual desktop application, an application executing on the server, among others. The first application can be provided by a content publisher (e.g., data of the first application can be from resources of the content publisher). The first application can include one or more content slots either displayed at a portion of the application interface. In some cases, such as with instantiated content slot, the content slot can be visible after a period of time from launching the application. In some implementations, such as in the second instance 520, the content slot can display an instantiated content item, where a DPS managing the content item can enable the visibility of the content slot based on the configuration of the first application's resources.

In the second instance 520, the client device can render a content slot having a content item. For example, the client device can be presented with a content slot enabled based on a timer (e.g., a set time since the launch of the application configured by the content publisher, among other techniques to present a content item to the user). The content slot can include a script, which when executed on the client device can cause the client device to transmit a request, to the DPS, for at least one content item. The DPS can provide the content item to the content slot rendered on the client device. In this case, the content item can include a portion 522 having an enquiry (e.g., a question) and one or more corresponding responses (e.g., a set of answers or choices for the user to select from), an exit icon 524, and an actionable object 526 (e.g., a button or another interactive element) having a link or a hyperlink to a second application (e.g., a web page or a store page for installing the second application). In some cases, the content item can include a marker 528 highlighting or hovering over a response. The marker 528 can indicate a corresponding response that will be selected if, for example, the user clicked on or pressed a selection button (e.g., enter, space, among others based on the setting of the first application or the content item). In some implementations, the marker 528 may not be part of the content item, but rather an indicator of a mouse icon for navigating to select an interactive element, the actionable object 526, the exit icon 524, or other areas rendered for display.

The DPS can generate the content item in the second instance 520 from metadata of an application (e.g., the second application) from a content provider. The DPS can generate the enquiry and the one or more corresponding responses based on the metadata of the application. For example, the content item can include an enquiry of "What Genre is 'Second Application'?" The 'Second Application' in this case can be replaced with the name or title of an application from a content provider. The DPS can retrieve the name of the application from a value of a name field in a field-value pair in the metadata. In this case, the DPS utilized a genre field (e.g., category field) and the name field of the metadata to generate the enquiry. Since the DPS used the genre of the application as the premise for the user to select a response, the DPS can select at least one value from the genre field to include as one of the interactive elements. For other interactive elements, the DPS can include other genres (or values) not indicated in the field-value pair. For example, if the genre field of the metadata from the second application includes adventure, puzzle, and non-fiction, the DPS can select action as one of the interactive elements. The DPS can select genres not presented in the field-value pair (e.g., action, mystery, etc.) to include as part of the interactive elements (e.g., associated with incorrect responses).

Referring to the previous example, the user can interact with the client device to place the marker 528 at one of the responses, such as the "adventure" genre. Since "adventure" is part of the genre field of the second application (e.g., metadata of the second application), the DPS can determine that the user selection (or response) is correct. Accordingly, in response to the user selecting the correct response, the DPS can provide a reward interface for rendering in the content slot. The reward interface can replace the content item for rendering the content slot. In some implementations, the DPS can provide a content item including a script for rendering in the content slot. In response to user selection of the correct response, the script of the content item can execute on the client device, which can cause the client device to present an image corresponding to a reward, where the reward can be provided to a user account in the first application. In some implementations, if the user selects an incorrect response, the script can cause the client device to provide a notification (e.g., in the content slot) indicating that the selection is incorrect. The content item can remain in the content slot for the user to reselect a second interactive element after an incorrect selection. In some cases, the DPS can replace the content item with another content item subsequent to prompting the user of the incorrect selection.

In some implementations, the DPS can provide the reward to the user account even if the user did not select a correct response. For example, the DPS can determine that the user is actively engaging with the content item (e.g., attempting to choose the correct response for the content item, hovering/moving a cursor over the interactive elements, selecting an incorrect response, attempting to choose a correct response for a second content item, etc.). After a time period (e.g., 30 seconds, 1 minute, etc.), the DPS can determine to provide the reward for the user for their effort. In some implementations, the reward can be different if the user did not select a correct response (e.g., fewer coins or less rarity of the item).

In the third instance 530, the client device can render a reward interface responsive to the user selecting the correct response. Concurrent or responsive to displaying the reward interface, the DPS can transmit an instruction to the first application to retrieve a reward corresponding to the reward interface (e.g., similar item or object to the image) and provide the reward to the user account. In some implementations, the DPS can retrieve the corresponding reward stored in the resources, such that the DPS can provide the reward to the user account responsive to the user selecting the correct response or being presented with the image of the reward.

Throughout the second instance 520 or the third instance 530, the DPS can maintain the exit icon 524 and the actionable object 526 for rendering in the content slot. For example, at any time while the content slot is visible or enabled on the display of the client device, the user can interact with the exit icon 524 to terminate the content slot or the content item. In some implementations, the DPS can insert the exit icon 524 into the content slot or the content item after a time period, such as 15 seconds after the content slot is visible on the client device. In some implementations, the DPS can insert the exit icon 524 after the user first attempted to select an interactive element. The actionable object 526 can be included at any portion in the content slot (or the content item), such as the bottom of the content item. In some cases, the DPS can include the actionable object 526 as a second content item in the same content slot, such that the link to the second application is separate from the content item associated with the metadata of the second application. By rendering the actionable object 526 throughout the presentation of the content item or the reward interface, the DPS can provide the user with chances to be redirected to an installation page for the second application, such as in response to interacting with the actionable object 526. For example, the actionable object 526 can include a script, which when executed can cause the client device to redirect to a page where the actionable object 526 is associated with or linked to.

In some implementations, the DPS can terminate the content item and/or the content slot after a duration of presenting the reward to the user (e.g., in the case that the user selects a correct response). For example, after presenting the reward interface for 10 seconds, the DPS can terminate the reward interface and the content slot for the user to continue using the first application. In some implementations, the DPS can terminate the content item and/or the content slot in response to a number of times the user failed to select a correct response or a number of times the user selects an incorrect response. For example, after a predetermined number of times (e.g., 3 attempts, 5 attempts, among other numbers configured by the DPS) the user selects an incorrect response, the DPS can terminate the content item and the content slot after notifying the user that the selection is incorrect (e.g., 5 seconds, etc. after the prompt). In some implementations, the appearance of the content item can be based on the metadata of the second application. For example, the background of the content item can include an image of the second application or include a color matching the image of the second application.

Figure 6:
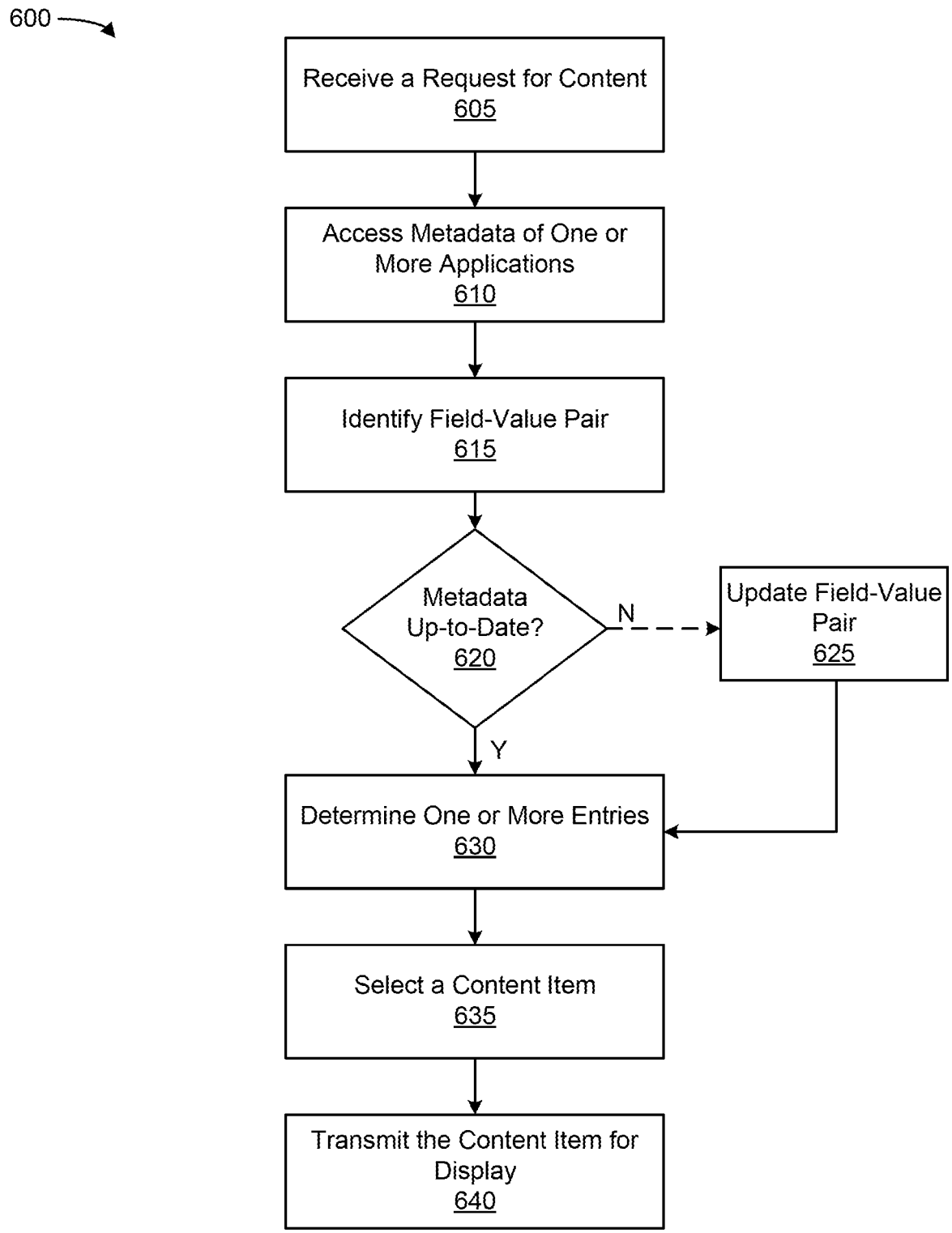
FIG. 6 is flowchart of an example method for generating enquiries and responses based on application metadata, according to an implementation.

Referring to FIG. 6, a flowchart of an example method for generating enquiries and responses based on application metadata is shown, according to an implementation. The functionality described herein with respect to method 600 can be performed or otherwise executed by one or more components of the computer system 100 as shown on FIG. 1, the DPS 112 as in FIGS. 1 and 2, among other computing systems or any combination thereof. In some implementations, the functionalities of method 600 may be split between one or more components of the computer system 100 in conjunction with at least FIGS. 1 and 2. The method 600 can include a DPS receiving a request for content, at step 605. At step 610, the DPS can access metadata of one or more applications. At step 615, the DPS can identify various field-value pairs. At step 620, the DPS may determine whether the metadata is up-to-date. At step 625, the DPS can update the field-value pairs. At step 630, the DPS can determine one or more entries associated with one or more applications. At step 635, the DPS can select a content item. At step 640, the DPS can transmit the content item for display on the client device.

Referring to FIG. 6 in further detail, at step 605, the DPS can receive a request for content from a client device. In some cases, the DPS can receive the request when the client device initiates an application of a content publisher. In some cases, the DPS can receive the request when the application presents a content slot, which can cause the client device to transmit a request for content to the DPS. The content slot of the application can be presented during launch or after a time period configured by the content publisher. For example, the content publisher can set a timer for providing certain types of content slots (e.g., banner, interstitial, etc.). After receiving the request for content, the DPS can proceed to step 610.

At step 610, the DPS can access metadata of one or more applications available for installation. By accessing these metadata, the DPS can provide at least one content item for rendering in a content slot, which can incentivize the user of the client device to install an application associated with the content item (e.g., enquiry, responses, or an actionable object associated with the application). The metadata of each application of the one or more applications can include a plurality of field-value pairs including values received from a device corresponding to a publisher (e.g., content publisher) of the application. For example, the content publisher can include one or more values in at least one of the fields for publishing the content item including enquiries and responses based on the field-value pairs in content slots. In this case, the content publisher can contribute to providing or configuring at least an interactive element or an enquiry for a content item, for example.

The application of the publisher (e.g., content publisher providing content slots for rendering content items) can be referred to as a first application, in some cases. For example, the client device can launch the first application and request content items for content slots in the first application. In some implementations, the request for content from the client device can include at least an identification of a second application (e.g., an application of a content provider). The request for content can include an identification of a content slot within which to present the content item. For example, the DPS can receive the request for content from the client device. From the request, the DPS can identify which application (or metadata of an application) to generate the entries from, including the entries in the content item, or to select the content item having enquiries or responses associated with the metadata of the application. After accessing the metadata of the application, the DPS can proceed to step 615.

At step 615, the DPS can identify various field-value pairs. The field-value pairs can be stored as part of the metadata of each application. The field-value pairs can be retrieved directly from the content provider providing the metadata or from data storage devices remote from the content provider. The field-value pairs, including the field name and the values associated with each field, can be presented in an information resource associated with the content provider, such as a web page of an application, an installation page, or a store page of the application. Using the field-value pairs, the DPS can generate one or more entries. Each entry can include an enquiry and corresponding responses to the enquiry. The entries may be stored in a database. In some implementations, the entries may be temporarily stored in the database responsive to receiving a request for content and generating the entries for the content. In this case, the entries can be removed or deleted after using the entries for generating one or more content items or presenting the one or more content items on the client device (e.g., after the content item terminates from display on the client device).

The field-value pairs can be updated by the content provider. For example, the content provider can edit a store page or a web page associated with the application. Contents, data, or information in at least one of the pages can be the metadata of the application. By updating the page, the content provider can update the metadata of the application. The DPS can retrieve the most up-to-date metadata for generating content items, where out-of-date content items may not be stored for use in subsequent requests for content. The DPS can proceed to 620, in this case, to determine the status of the metadata, for example, when the metadata is not reflected in one of the data storage devices or resources after the content provider provides updated metadata. In some implementations, if the DPS retrieve the metadata from a storage device associated with the content provider, where metadata is up-to-date and no check is to be done by the DPS, the DPS can proceed to step 630.

At step 620, the DPS may determine whether the metadata is up-to-date. For instance, the metadata of one or more applications can be stored in a data storage device remote from the device of the content provider. The DPS or other processing systems may utilize metadata from the data storage device instead of communicating directly to the content provider device. Hence, the DPS can determine whether the metadata is up-to-date to retrieve the latest information. The DPS can determine whether the content provider updated the metadata which has not been reflected in the metadata stored in the data storage device. For example, if the DPS relies on metadata from the data storage device, the DPS can determine whether the metadata is out-of-date (e.g., last updated 30 hours ago, 1 week ago, etc.) and sync the metadata according the latest updated metadata. In some implementations, the DPS can retrieve the metadata directly from the content provider the installation page of the application from the content provider, thereby having the latest up-to-date metadata. In these implementations, the DPS can skip checking whether the metadata is up-to-date and proceed to step 630. However, in the case that there are devices that use metadata from the data storage device, the DPS can proceed to step 625 if the metadata is not up-to-date.

At step 625, the DPS can update the field-value pairs. For example, the DPS or other processing systems may rely on metadata from data storage devices remote from the content provider (e.g., content provider device). The DPS can communicate with the content provider to sync the metadata from the content provider to the metadata stored in the data storage devices. When updating the metadata, the field-value pairs of the metadata can be updated for use in generating enquiries, corresponding responses, and/or content items. The DPS can proceed to step 630 after updating the metadata.

At step 630, the DPS can determine one or more entries associated with one or more applications. The DPS can determine the one or more entries from the metadata of the one or more applications. The one or more entries can include one or more enquiries and corresponding one or more responses. In some cases, determining one or more entries can refer to the DPS generating the one or more entries from the metadata responsive to a request for content, at a predetermined time period (e.g., 1 day, 2 days, 3 days, etc.), or responsive to an update to the metadata. In some implementations, if the entries are stored in a data storage device, the DPS can refresh, update, or otherwise replace the currently stored entries with updated entries based on the metadata of one or more applications. By determining the entries, the DPS can identify at least one entry to include in a content item. In some implementations, determining the entries can refer to determining the context of content items. For example, the entries can be included as part of content items. The DPS can determine the entries of the content items for selecting which content item to render on the client device. The DPS can proceed to step 635 after determining the entries.

At step 635, the DPS can select a content item including a subset of the one or more entries and an actionable object. The subset of the entries can include at least one entry including an enquiry and corresponding responses. The responses can vary in number, such as based on the enquiry (e.g., field(s) used to generate the enquiry), size of the content slot, or preferences by either the content provider or content publisher (e.g., configurable by the content provider or adjustable by the content publisher publishing the content item). When the client device selects the actionable object, the actionable object (or the script included in the actionable object) can cause the client device to access an information resource from which an application of the one or more applications can be installed. For instance, the actionable object can include a hyperlink associated with the application of the content provider, such as an installation page, a store page, or a web page of the content provider or the application. When selected, the client device can be redirected to the corresponding information resource.

In some implementations, the DPS can select the content item based on the identification of the second application. For example, the DPS can receive a request for content with an identification of a second application (e.g., application of a content provider). Based on what application is identified, the DPS can select the content item generated from the metadata of the respective application identified by the identification of the second application. In some implementations, the DPS can select the content item based on a type of the content slot for displaying the content item. For example, the content slots can vary in sizes, shapes, locations, or when the content slot appears on the client device. Based on the content slot, the DPS can determine which content item to select, such as how many responses should be included, the background of the content item (e.g., to match the background of the first application at that time, which could change based on the events in the first application), types of content items that will be relevant to the user, among other criteria to select a content item.

In some implementations, instead of selecting the content item, the DPS can select the subset of the one or more entries for inclusion in a content item (e.g., thereby generating the content item). The DPS can select each entry of the subset by identifying, from the field-value pairs of the metadata of the application, a priority of each field. For example, based on the priority of each field, the DPS can select the top priority entry or at least one of the top entries in a priority list. By selecting at least one of these entries, the DPS can generate a content item. The priority can be assigned based on at least a number of values associated with the field, or a number of incorrect responses previously received from client devices to which content items including enquiries for the field. For example, with a higher number of values associated with the field, the DPS can generate more responses for each enquiry based on the field (e.g., category field, description field, rules field, keyword field, etc.). With a lower number of values associated with the field, the DPS may not be able to generate many responses for inclusion in the content item (e.g., version field, number of downloads field, application size field, etc.) However, this may not be the case, and even with a low number of values, for example, if the category field has only one value, the DPS can still rank the field as having a high priority due to other responses the DPS can include as part of the interactive elements or if the DPS can generate responses that can be notable by users.

In further example, the DPS can adjust the priority of the fields based on a number of incorrect responses. The number of any responses can refer to a ratio, a count of a number of times, or other metrics for monitoring the choices selected by the user. If a certain field used for entries of content items received a high number of incorrect responses (e.g., 8/10 responses or over 1000 incorrect responses within a span of a day or a week), the DPS can assign a low priority to this field, such as when generating or selecting other entries or content items. In some implementations, the DPS can adjust the priority of the fields based on a number of correct responses. For example, the DPS can determine that for content items using a certain field(s) for entries, the ratio of users selecting the correct response is over 95%, among other thresholds that can be configured by the DPS or the content provider. Instead of setting a high priority for fields having the highest correct response rate, the DPS can assign a medium priority to these fields, such that content items incentivize an understanding of a second application rather than providing free rewards, for example. In some cases, the DPS can automatically lower the priority of certain fields having the highest number of correct responses, such that other fields can be used for content items. In some cases, the DPS may not select one of the top prioritized entries but can opt for a lower priority entry. For example, to test whether the fields or entries should be moved up in priority, the DPS can use lower priority fields to generate or select content items. The DPS can perform this selection, for example, once a week, a month, among other timeframes. In some cases, the DPS may not enable this function, such that the DPS may select content items having fields within a certain range of priority (e.g., top 10 or 20 fields).

By generating enquiries and responses from metadata accessible to the DPS and generating content items using the metadata, the DPS can reduce resource consumption (e.g., reduce the amount of data stored in a database to generate content items), reduce network traffic or network congestion (e.g., the amount of data transmitted to and received from the content provider), and reduce time consumption for content providers (e.g., no need for content providers to generate such enquiries and responses, arrange the content for content items, or update their inventory of enquiries and responses).

At step 640, the DPS can transmit, to the client device, the content item for display on the client device. For example, the DPS can transmit data of the content item having a least an enquiry, responses, and an actionable object to a content slot. The content slot can render the content item for display on the client device. The DPS can receive an input from the client device selecting at least one interactive element (e.g., corresponding response) in the content item. The DPS can determine that the input corresponds to a correct response associated with the content item. In some cases, the DPS can terminate the content item on the client device subsequent to the input corresponding to a correct response. In some other cases, the DPS can disable visibility of the content item from display on the client device.

In some implementations, the DPS can select the subset of the one or more entries for inclusion in the content item using a selection model. The selection model can be trained using historical interaction data from client devices with content items previously generated and presented to the client devices. Using the selection model, the DPS can determine which subset of the one or more entries is of interest to a respective user and would likely result in interaction by the user (e.g., incentivizing or increasing user engagement). For example, the DPS can receive interaction data with the content item presented on the client device. The interaction data can identify responses selected at the client device, indicating whether the responses correspond to a correct or incorrect response associated with the content item. The DPS can update the selection model for selecting entries for various client devices based on the interaction data from the client device. For example, if the DPS receives interaction data indicating an incorrect response from the client device, and in some cases, interaction data from other client devices often (e.g., 8/10) indicate incorrect responses, the DPS may not select entries where client devices often select incorrect responses. In some implementations, the DPS can determine from the interaction data that client devices select the same potentially incorrect responses. In this case, the DPS may notify the content provider to confirm the accuracy of the metadata. Accordingly, the DPS can maintain or increase the accuracy of the metadata for applications of content providers.

In some implementations, the content item can include a script. The script can execute on the client device responsive to at least one event occurring on the client device or to the content item, such as enabling the content slot one the client device for rendering a content item, inputting the content item in the content slot, or interaction with the content item, for example. The script can cause the client device to perform one or more features and functionalities described herein. For example, the script can cause the client device to present the subset of the one or more entries within a content slot (e.g., present an enquiry and responses within a content slot or presenting at least one content item with one or more entries). The client device can detect interaction data from user's selection of one or more interactive elements associated with the subset of the one or more entries. The interactive elements can be, or include, one or more responses corresponding to an entry. The client device can provide, to the DPS, the interaction data detected from the selection of the one or more interactive elements within the content slot. The interaction data can indicate whether the selected interactive element is a correct response or an incorrect response.

In some implementations, the content item can include an image corresponding to the reward and the script. The image can refer to a reward interface displaying the reward responsive to the user selecting a correct response. For example, the client device can present the subset of the one or more entries within a content slot (e.g., at least one enquiry and corresponding responses). The client device can detect first interaction data from selection of one or more interactive elements associated with the subset of the one or more entries. The client device can determine that the selection indicates an incorrect response. Accordingly, the client device can provide, to a display device of the client device, a notification indicating that the selection is incorrect. In some cases, the client device can terminate or disable visibility of the content item subsequent to notifying the user that the selection is incorrect. In this case, the user or the user account may not be provided with any reward. In some implementations, the client device can detect second interaction data from selection of other one or more interactive elements associated with the subset of the one or more entries. The client device can determine that the selection indicates a correct response. Accordingly, the client device can present, to the display device of the client device, the image corresponding to the reward responsive to determining that the second interaction data corresponds to the correct response. The first interaction data and second interaction data can include an indication of interaction or selection of at least one interactive element within the content item. In this case, when presenting the reward to the client device or also responsive to determining that the second interaction data corresponds to the correct response, the DPS can notify the content publisher (e.g., device of the content publisher) to provide a reward to the user account that provided a correct response. The reward can be the same reward as shown in the image.

In some implementations, the DPS can determine subsequent to presenting the content item on the client device, that an interaction time exceeds a threshold. For example, the DPS can monitor the activities or interaction data of the client device. The DPS can determine that the user of the client device is actively attempting to provide a correct response (e.g., moving the cursor within the content item, an indication of the user reading the enquiry and responses, selection of incorrect responses after contemplating, among others). For the user's effort, the DPS can trigger a script of the content item to cause the client device to present a reward corresponding to the content item responsive to the interaction time exceeding the threshold. The interaction time can be predetermined or based on a counter which activates during the movement of the cursor or other activities performed by the user, for example. The predetermined time or when the counter reached a time limit can be configured by the content publisher, the content provider, or the DPS (e.g., 30 seconds, 1 minute, etc.). In some implementations, without receiving interaction data indicating a selection of a correct response, the DPS may not provide a reward to the user (e.g., the client device or the user account within the first application).

In some implementations, by executing the script and the client device determining that the user selected a correct response, the client device can transmit, responsive to determining that the correct response was selected, to an entity associated with a content provider, an instruction to update a value corresponding to the content provider. The value can correspond to a performance metric of the content item, such as corresponding to the subset of the one or more entries and the actionable object associated with the application. For example, the DPS can transmit an instruction to increase a ratio of the performance metric indicating the likelihood of client devices selecting a correct response for the field-value pairs used to generate the content item. The performance metric can indicate the performance of each field-value pairs when used to generate content items.

In some implementations, if the interaction data indicates a selection of an incorrect response, the DPS may lower the performance metric associated with the entry the user interacts with. In some cases, the performance metric can indicate a conversion rate for user interaction with at least one of the responses or an actionable object to download the application. In other words, the performance metric can indicate an engagement performance of the user, such that receiving a selection of a response or the actionable object can increase the performance metric. Otherwise, if the client device receives interaction data indicating a selection of the exit icon, the performance metric can decrease, indicating that users are not engaged or do not want to interact with the content item. The performance metric can be updated for or update to the content provider to determine the performance of the content item campaign registered by the content provider. In some cases, the DPS can perform prioritization or selection of entries or content items based on the performance metric. For example, the DPS can prioritize content items or entries having a higher performance metric (e.g., users are likely to interact with) for display on client devices.

In some implementations, after constructing and updating a performance metric for a time period (e.g., 10 days, 20 days, etc.), the DPS can determine to use entries from a range of the performance metric (e.g., top 30% of the entries) for rendering content items. Therefore, some field-value pairs may not be used to generate or select content items after a time period. In some implementations, the DPS can reset the performance metric after a time period, such as 1 month, 2 months, or quarterly. Therefore, entries (e.g., fields) having a low-valued performance metric can be used at a later time. In some cases, these fields may perform better after resetting the performance metric, for example.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to maintaining session identifiers across multiple webpages for content selection and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method comprising:
receiving, by a data processing system, from a client device, a request for content;
accessing, by the data processing system, metadata of one or more applications available for installation, the metadata of each application of the one or more applications comprises a plurality of field-value pairs including values received from a device corresponding to a publisher of the application;
determining, by the data processing system, from the metadata, one or more entries associated with the one or more applications, the one or more entries comprising one or more enquiries and corresponding one or more responses;
selecting, by the data processing system, a content item including a subset of the one or more entries and an actionable object, which when selected, causes the client device to access an information resource from which an application of the one or more applications can be installed; and
transmitting, by the data processing system, to the client device, the content item for display on the client device.

2. The method of claim 1, further comprising:
receiving, by the data processing system, from the client device, an input corresponding to a correct response associated with the content item; and
terminating, by the data processing system, the content item on the client device; or
disabling, by the data processing system, visibility of the content item from display on the client device.

3. The method of claim 1, wherein the application is a first application and wherein the request for content comprises an identification of a second application including a content slot within which to present the content item.

4. The method of claim 3, wherein selecting the content item comprises selecting, by the data processing system, the content item based on the identification of the second application and a type of the content slot.

5. The method of claim 1, further comprising selecting, by the data processing system, the subset of the one or more entries for inclusion in the content item, the data processing system selecting each entry of the subset by identifying, from the plurality of field-value pairs of the metadata of the application, a priority of each field, the priority assigned based on i) a number of values associated with the field, or ii) a number of incorrect responses previously received from client devices to which content items including enquiries for the field.

6. The method of claim 1, wherein the subset of the one or more entries is selected for inclusion in the content item using a selection model, and wherein the method further comprises:
receiving, by the data processing system, from the client device, interaction data with the content item presented on the client device, the interaction data identifying responses selected at the client device; and
updating, by the data processing system, the selection model for selecting a plurality of entries for a plurality of client devices based on the interaction data from the client device.

7. The method of claim 1, wherein the content item includes a script, which when executed on the client device, causes the client device to:
present the subset of the one or more entries within a content slot;
detect interaction data from selection of one or more interactive elements associated with the subset of the one or more entries; and
provide, to the data processing system, the interaction data detected from the selection of the one or more interactive elements within the content slot.

8. The method of claim 1, wherein the content item comprises an image corresponding to a reward and a script, which when executed on the client device, causes the client device to:
present the subset of the one or more entries within a content slot;
detect first interaction data from selection of one or more interactive elements associated with the subset of the one or more entries;
determine that the selection indicate an incorrect response;
provide, to a display device of the client device, a notification indicating that the selection is incorrect;
detect second interaction data from selection of other one or more interactive elements associated with the subset of the one or more entries;
determine that the selection indicate a correct response; and
present, to the display device of the client device, the image corresponding to the reward responsive to determining that the second interaction data corresponds to the correct response.

9. The method of claim 1, further comprising:
determining, by the data processing system, subsequent to presenting the content item on the client device, that an interaction time exceeds a threshold; and
triggering, by the data processing system, a script of the content item to cause the client device to present a reward corresponding to the content item responsive the interaction time exceeding the threshold.

10. The method of claim 1, wherein the content item comprises a script, which when executed on the client device, causes the client device to:
present the subset of the one or more entries within a content slot;
detect interaction data from selection of one or more interactive elements associated with the subset of the one or more entries;
determine that the selection indicates a correct response; and
transmit, responsive to determining that the correct response was selected, to an entity associated with a content provider, an instruction to update a value corresponding to the content provider, the value corresponding to a performance metric of the content item including the subset of the one or more entries and the actionable object associated with the application.

11. A system comprising:
a data processing system comprising one or more processors and memory, the data processing system configured to:
receive, from a client device, a request for content;
access metadata of one or more applications available for installation, the metadata of each application of the one or more applications comprises a plurality of field-value pairs including values received from a device corresponding to a publisher of the application;

determine, from the metadata, one or more entries associated with the one or more applications, the one or more entries comprising one or more enquiries and corresponding one or more responses;

select a content item including a subset of the one or more entries and an actionable object, which when selected, causes the client device to access an information resource from which an application of the one or more applications can be installed; and transmit, to the client device, the content item for display on the client device.

12. The system of claim 11, wherein the data processing system is further configured to:

receive, from the client device, an input corresponding to a correct response associated with the content item; and terminate the content item on the client device; or disable visibility of the content item from display on the client device.

13. The system of claim 11, wherein the application is a first application and wherein the request for content comprises an identification of a second application including a content slot within which to present the content item.

14. The system of claim 13, wherein to select the content item, the data processing system is configured to select the content item based on the identification of the second application and a type of the content slot.

15. The system of claim 11, wherein the data processing system is further configured to select the subset of the one or more entries for inclusion in the content item, the data processing system selecting each entry of the subset by identifying, from the plurality of field-value pairs of the metadata of the application, a priority of each field, the priority assigned based on i) a number of values associated with the field, or ii) a number of incorrect responses previously received from client devices to which content items including enquiries for the field.

16. The system of claim 11, wherein the subset of the one or more entries is selected for inclusion in the content item using a selection model, and wherein the data processing system is further configured to:

receive, from the client device, interaction data with the content item presented on the client device, the interaction data identifying responses selected at the client device; and update the selection model for selecting a plurality of entries for a plurality of client devices based on the interaction data from the client device.

17. The system of claim 11, wherein the content item includes a script, which when executed on the client device, causes the client device to:

present the subset of the one or more entries within a content slot;

detect interaction data from selection of one or more interactive elements associated with the subset of the one or more entries; and provide, to the data processing system, the interaction data detected from the selection of the one or more interactive elements within the content slot.

18. The system of claim 11, wherein the content item comprises an image corresponding to a reward and a script, which when executed on the client device, causes the client device to:

present the subset of the one or more entries within a content slot;

detect first interaction data from selection of one or more interactive elements associated with the subset of the one or more entries;

determine that the selection indicate an incorrect response;

provide, to a display device of the client device, a notification indicating that the selection is incorrect;

detect second interaction data from selection of other one or more interactive elements associated with the subset of the one or more entries;

determine that the selection indicate a correct response; and present, to the display device of the client device, the image corresponding to the reward responsive to determining that the second interaction data corresponds to the correct response.

19. The system of claim 11, wherein the data processing system is further configured to:

determine, subsequent to presenting the content item on the client device, that an interaction time exceeds a threshold; and trigger a script of the content item to cause the client device to present a reward corresponding to the content item responsive the interaction time exceeding the threshold.

20. The system of claim 11, wherein the content item comprises a script, which when executed on the client device, causes the client device to:

present the subset of the one or more entries within a content slot;

detect interaction data from selection of one or more interactive elements associated with the subset of the one or more entries;

determine that the selection indicates a correct response; and transmit, responsive to determining that the correct response was selected, to an entity associated with a content provider, an instruction to update a value corresponding to the content provider, the value corresponding to a performance metric of the content item including the subset of the one or more entries and the actionable object associated with the application.

* * * * *